United States Patent
Chen

(10) Patent No.: US 12,554,668 B2
(45) Date of Patent: Feb. 17, 2026

(54) CHIP MANAGEMENT APPARATUS AND RELATED METHOD

(71) Applicant: Huawei Technologies Co., Ltd., Shenzhen (CN)

(72) Inventor: Rujie Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/748,324

(22) Filed: Jun. 20, 2024

(65) Prior Publication Data
US 2024/0345980 A1  Oct. 17, 2024

Related U.S. Application Data

(63) Continuation of application No. PCT/CN2021/139754, filed on Dec. 20, 2021.

(51) Int. Cl.
G06F 9/455   (2018.01)
G06F 9/50    (2006.01)
G06F 11/14   (2006.01)
G06F 13/40   (2006.01)

(52) U.S. Cl.
CPC ................ *G06F 13/4068* (2013.01)

(58) Field of Classification Search
None
See application file for complete search history.

(56) References Cited

U.S. PATENT DOCUMENTS

| | | | |
|---|---|---|---|
| 7,598,958 B1 | 10/2009 | Kelleher | |
| 9,047,074 B2 * | 6/2015 | Pfeifer | G06F 1/266 |
| 10,992,276 B2 | 4/2021 | Holman et al. | |
| 12,353,376 B2 * | 7/2025 | Nara | G06F 16/2343 |
| 2010/0042809 A1 | 2/2010 | Schenfeld et al. | |
| 2011/0134132 A1 | 6/2011 | Wolf | |
| 2019/0206023 A1 | 7/2019 | Dimitrov et al. | |
| 2019/0391831 A1 * | 12/2019 | Yang | H04L 67/10 |
| 2020/0042664 A1 * | 2/2020 | Lee | G06F 30/31 |

(Continued)

FOREIGN PATENT DOCUMENTS

DE  102018132468 A1  7/2019

OTHER PUBLICATIONS

Jungwon Kim et al.: "Achieving a single compute device image in OpenCL for multiple GPUs" ACM SIGPLAN Notices, vol. 46, Issue 8, Feb. 12-16, 2011, pp. 277-288.

*Primary Examiner* — Hyun Nam
(74) *Attorney, Agent, or Firm* — Conley Rose, P.C.

(57) ABSTRACT

A chip management apparatus includes a device management unit, a system management unit, and N computing nodes. The device management unit is configured to: obtain interface information of each of the N computing nodes, and determine an interconnection relationship between the N computing nodes based on the interface information of the N computing nodes. The system management unit is configured to group, based on the interconnection relationship between the N computing nodes and computing power information of the N computing nodes, the N computing nodes into M first collaboration groups. Each of the M first collaboration groups includes at least one computing node, and the at least one computing node included in each first collaboration group has a same computing power and is physically interconnected.

20 Claims, 13 Drawing Sheets

(56) References Cited

U.S. PATENT DOCUMENTS

| | | | |
|---|---|---|---|
| 2020/0328844 A1* | 10/2020 | Babich | H04L 1/0061 |
| 2024/0345980 A1* | 10/2024 | Chen | G06F 9/5044 |
| 2025/0218025 A1* | 7/2025 | Jensen | G06T 7/75 |

* cited by examiner

| First identification information table | | | |
|---|---|---|---|
| Computing node | Physical device identifier 01 | Mark identifier 0A | Interconnection relationship 0A-0B |
| Computing node | Physical device identifier 02 | Mark identifier 0B | Interconnection relationship 0B-0A |
| ⋮ | | | |
| Computing node | Physical device identifier 01 | Mark identifier 0X | Interconnection relationship 0X-0Y |
| Computing node | Physical device identifier 02 | Mark identifier 0Y | Interconnection relationship 0Y-0X |

FIG. 8

CHIP MANAGEMENT APPARATUS AND RELATED METHOD

CROSS-REFERENCE TO RELATED APPLICATIONS

This is a continuation of Int'l Patent App. No. PCT/CN2021/139754, filed on Dec. 20, 2021, which is incorporated by reference.

FIELD

The present disclosure relates to the field of computer technologies, and in particular, to a chip management apparatus and a related method.

BACKGROUND

With development of science and technologies, people have increasingly high requirements on a chip manufacturing process (precision of an integrated circuit). A smaller manufacturing process indicates higher difficulty in manufacturing a chip. In other words, it is increasingly difficult to improve a capability of the chip by packaging more transistors on a monolithic chip of a specific area. Therefore, a chip design company packages a plurality of monolithic chips together to form a larger chip, to improve a processing capability of the chip. For example, a plurality of chips are packaged on a board, and the chips may be interconnected through a high-speed bus, and may provide a processing capability externally in a unified manner.

Currently, in a deep learning training scenario, service training is generally performed in a parallel running manner, to reduce running time. For example, services are trained in a data parallelism manner or a model parallelism manner. When delivering training tasks, a system may allocate parallel tasks that have parallel requirements to chips with a same computing power for processing. In a training process, if data synchronization needs to be performed between the chips, data may be transmitted through a high-speed bus. However, in the foregoing process, if a distance between the chips that have the same computing power and to which the parallel tasks are allocated is long and an interconnection bandwidth is small, when data synchronization is performed between the chips that execute the parallel tasks, performance of these chips is reduced, and training efficiency of the training task is affected.

Therefore, how to provide a chip management apparatus to improve processing performance of a chip is an urgent problem to be resolved.

SUMMARY

Embodiments provide a chip management apparatus and a related method, to improve processing performance of a chip.

According to a first aspect, an embodiment provides a chip management apparatus. The chip management apparatus includes a device management unit, a system management unit, and N computing nodes. N is an integer greater than 0. The device management unit is configured to: obtain interface information of each of the N computing nodes, and determine an interconnection relationship between the N computing nodes based on the interface information of the N computing nodes. The system management unit is configured to group, based on the interconnection relationship between the N computing nodes and computing power information of the N computing nodes, the N computing nodes into M first collaboration groups. M is an integer greater than 0. Each of the M first collaboration groups includes at least one computing node, and the at least one computing node included in each first collaboration group has a same computing power and is physically interconnected.

Currently, in a deep learning training scenario, a plurality of computing nodes may process services of a same type in parallel, to reduce running time. Because computing powers of computing nodes may be different, computing rates of the plurality of computing nodes may be different when the plurality of computing nodes process the services of a same type in parallel. Therefore, during service data synchronization, a computing node with a higher computing power (a higher computing rate) needs to wait for a computing node with a lower computing power (a lower computing rate) to complete computing before continuing to run a service. In this process, processing performance of the computing node is reduced. In one technology, a system management unit may separately obtain computing power information of the plurality of computing nodes, and group computing nodes that have a same computing power into one collaboration group, so that the system management unit allocates, based on the collaboration group, parallel tasks to the computing nodes that have a same computing power for processing. Therefore, different computing nodes can complete the parallel tasks simultaneously (that is, computing rates between the computing nodes are the same), thereby improving processing performance of the computing node. However, in an actual process, it is found that, because the system management unit cannot sense whether physical locations of the computing nodes are adjacent and the computing nodes are interconnected through a high-speed bus, if the parallel tasks are allocated to computing nodes that have a same computing power but are far away from each other and have a small interconnection bandwidth for processing, when data synchronization is performed between the computing nodes that execute the parallel tasks, performance of these computing nodes is also reduced, and training efficiency of the training task is affected.

However, in this embodiment, a device management unit is added to the chip management apparatus, interface information of the computing nodes is uniformly obtained, and a physical interconnection relationship between the computing nodes is determined based on the interface information. In this way, the system management unit can obtain the physical interconnection relationship between the computing nodes through the device management unit, and then group computing nodes that have a same computing power and are physically interconnected into one collaboration group. Further, when allocating the parallel tasks, the system management unit may allocate the parallel tasks to a plurality of computing nodes that have a same computing power and are connected through a high-speed bus for processing. This avoids a problem in the technology that the system management unit cannot sense whether the physical locations of the computing nodes are adjacent and the computing nodes are interconnected through the high-speed bus, and allocates the parallel tasks to the computing nodes that have a same computing power but are far away from each other and have the small interconnection bandwidth for processing, and when data synchronization is performed between the computing nodes that execute the parallel tasks, performance of the computing nodes is reduced. This improves processing performance of the computing nodes.

In a possible implementation, the N computing nodes are located in L chips. The device management unit includes L device management subunits, one chip includes one device management subunit, and L is an integer greater than 0 and less than N. A first device management subunit in the L device management subunits is configured to: obtain interface information of K computing nodes included in a chip in which the first device management subunit is located, where the first device management subunit is any one of the L device management subunits; and determine an interconnection relationship between the K computing nodes based on the interface information of the K computing nodes, where the interconnection relationship between the N computing nodes includes an interconnection relationship between computing nodes in each of the L chips.

In this embodiment, the chip management apparatus may include a plurality of chips, and each chip may further include a plurality of computing nodes (for example, one computing node may be one die in the chip). In other words, the N computing nodes included in the chip management apparatus are located in the L chips, where L is greater than 0 and less than N. Because computing nodes between different chips are not adjacent or an interconnection bandwidth is small, the device management unit may include a plurality of device management subunits, and the plurality of device management subunits are distributed in different chips. Each device management subunit is configured to obtain interface information of a plurality of computing nodes included in a chip on which the device management subunit is located, and determine a physical interconnection relationship between the plurality of computing nodes, so that the physical interconnection relationship between the N computing nodes in the chip management apparatus can be obtained more conveniently and efficiently.

In a possible implementation, the N computing nodes are located in N chips, the N chips are cascaded on a chip board, the chip board includes the device management unit, and the interconnection relationship between the N computing nodes comprises an interconnection relationship between the N chips.

In this embodiment, the chip management apparatus may include a plurality of chips, and each chip includes only one computing node (which may also be understood as that one chip is one computing node). In this case, the device management unit may be located on the chip board integrating the plurality of chips, and is configured to obtain interface information of the chips, and determine a physical interconnection relationship between the chips, so that the physical interconnection relationship between the N computing nodes in the chip management apparatus can be more accurately obtained.

In a possible implementation, a plurality of applications are run on the N computing nodes, and the system management unit is further configured to: pre-group the N computing nodes, where each pre-group includes a plurality of computing nodes that are capable of running a same application; and send pre-grouping information of the N computing nodes to the device management unit. The device management unit is further configured to determine the physical interconnection relationship between the N computing nodes based on the pre-grouping information of the N computing nodes and the interface information of each computing node.

In this embodiment, when the N computing nodes in the chip management apparatus are configured to run different applications, even if the computing nodes that run the different applications are interconnected through a high-speed bus, resource sharing cannot be performed (that is, data transmission cannot be performed between the computing nodes). However, because the device management unit cannot actively sense which computing nodes need to run a same application, the system management unit may first pre-group the computing nodes that run the same application, and then the system management unit sends pre-grouping information to the device management unit, so that the device management unit can determine, based on the pre-grouping information, the computing nodes that run the same application, and determine that the plurality of computing nodes that are interconnected through a high-speed bus and that run the same application have a physical interconnection relationship. This avoids a problem that the device management unit cannot sense which computing nodes need to run the same application, and determines that the plurality of computing nodes that run the different applications have a physical interconnection relationship, so that these computing nodes cannot normally run parallel tasks. This improves processing performance of the computing nodes.

In a possible implementation, the interconnection relationship is the high-speed bus interconnection relationship between the computing nodes that run the same application.

In this embodiment, it is assumed that two computing nodes have an interconnection relationship. It may be understood that the two computing nodes are connected through a high-speed bus, and a same application may be run on the two computing nodes. When data synchronization is performed between the two computing nodes, data is transmitted through the high-speed bus, and data synchronization efficiency is high.

In a possible implementation, the device management unit is further configured to: obtain a first identification information table from a target computing node, where the target computing node is any one of the N computing nodes; and associate, based on the first identification information table, a plurality of interconnected computing nodes in the N computing nodes.

In this embodiment, the device management unit may obtain an identification information table, and associate a plurality of interconnected computing nodes in the information table, so that the device management unit can more accurately mark an interconnection relationship between the computing nodes.

In a possible implementation, each of the N computing nodes has one physical device identifier, and each of the N computing nodes is configured to: generate one mark identifier, where each of the N computing nodes corresponds to a different mark identifier; and establish a first mapping relationship between the mark identifier and the physical device identifier.

In this embodiment, each computing node has one physical device identifier (the physical device identifier is allocated by a hardware manufacturer that uses a chip or a system that uses the chip), and a user may obtain a hardware resource of a corresponding computing node based on the physical device identifier. However, because hardware manufacturers that use chips may be different, it cannot be ensured that physical device identifiers and computing nodes in the chip are in a one-to-one correspondence in different hardware manufacturers or in different systems. In different systems, a same physical device identifier may correspond to different computing nodes. To avoid such problem, each computing node in the chip management apparatus may generate a globally unique mark identifier for the computing node based on a preset algorithm (for example, a random algorithm), and then establish a mapping relationship between the mark identifier and a physical device identifier, so that each computing node in the chip management apparatus corresponds to one unique identifier. Further, the physical interconnection relationship between the computing nodes may be established based on the identifier, so that the physical interconnection relationship between the N computing nodes in the chip management apparatus can be obtained more accurately.

In a possible implementation, the system management unit is further configured to: obtain the first mapping relationship of each of the N computing nodes; and generate the first identification information table, where the first identification information table includes the first mapping relationship of each of the N computing nodes.

In this embodiment, the system management unit in the chip management apparatus may uniformly collect mapping relationships between the physical device identifiers and the mark identifiers of the computing nodes, and generate an identification information table based on these mapping relationships. In this way, the system management unit can accurately distinguish different computing nodes when performing collaborative grouping.

In a possible implementation, the system management unit is further configured to: send the first identification information table to each of the N computing nodes. Each of the N computing nodes is further configured to store the first identification information table.

In this embodiment, the system management unit in the chip management apparatus may further send the mapping relationships (that is, the identification information table) between the physical device identifiers and the mark identifiers of the computing nodes to each computing node, so that each computing node can store the identification information table, so as to avoid a user from randomly modifying the mapping relationship between the physical device identifier and the mark identifier of the computing node. In addition, the system management unit can synchronize the mark identifier of each computing node more conveniently and efficiently among the computing nodes.

In a possible implementation, the device management unit is further configured to: obtain the first identification information table from the target computing node based on the physical device identifier of the target computing node; and associate, based on the first identification information table, mark identifiers of the physically interconnected computing nodes in the N computing nodes.

In this embodiment, because each computing node stores the identification information table (the identification information table records the mark identifiers of all the computing nodes), the device management unit may obtain the identification information table based on a physical device identifier of any computing node, and then associate mark identifiers of interconnected computing nodes, thereby avoiding a case in which one physical device identifier corresponds to a plurality of computing nodes when the physical device identifiers of the computing nodes are used for association. In this way, the device management unit can more accurately mark the interconnection relationship between the computing nodes.

In a possible implementation, the system management unit is further configured to group interconnected computing nodes that have a same computing power and a same function into one first collaboration group.

In this embodiment, the system management unit in the chip management apparatus may group physically interconnected computing nodes that have a same computing power and a same function into one collaboration group based on the interconnection relationship that is obtained by the device management unit and that is of the mark identifiers between the plurality of computing nodes and computing power information and function information of the plurality of computing nodes. Further, when allocating the parallel tasks, the system management unit may allocate the parallel tasks to the plurality of computing nodes that have a same function, a same computing power, and are connected through a high-speed bus for parallel processing. This avoids a problem in the technology that the system management unit cannot sense whether the physical locations of the computing nodes are adjacent and the computing nodes are interconnected through the high-speed bus, and allocates the parallel tasks to the computing nodes that have a same computing power but are far away from each other and have the small interconnection bandwidth for processing, and when data synchronization is performed between the computing nodes that execute the parallel tasks, performance of the computing nodes is reduced. This improves processing performance of the computing nodes.

In a possible implementation, the system management unit is further configured to: select a target collaboration group from the M first collaboration groups based on a computing power requirement required by a to-be-executed task, where the to-be-executed task includes a plurality of parallel tasks; and respectively allocate the plurality of parallel tasks to a plurality of computing nodes based on mark identifiers of the plurality of computing nodes in the target collaboration group.

In this embodiment, when allocating to-be-executed tasks (including a plurality of parallel tasks), the system management unit in the chip management apparatus may first select one target collaboration group from a plurality of collaboration groups based on computing powers required by the to-be-executed tasks, and then allocate, based on mark identifiers of a plurality of computing nodes included in the target collaboration group, the plurality of parallel tasks to the plurality of computing nodes for processing, so that the computing nodes that have a same computing power and are physically interconnected process parallel tasks of a same type (that is, the computing nodes in the target collaboration group can process tasks of a same type at a same running rate), thereby improving performance of the computing nodes.

In a possible implementation, the device management unit is further configured to: determine, based on the first identification information table, physical device identifiers respectively corresponding to the mark identifiers of the plurality of computing nodes in the target collaboration group; and respectively allocate, based on the physical device identifiers respectively corresponding to the plurality of computing nodes, the plurality of parallel tasks to the corresponding computing nodes, where one parallel task corresponds to one physical device identifier.

In this embodiment, because the hardware resource of the computing node can be obtained only based on the physical device identifier of the computing node (that is, the hardware resource of the computing node cannot be obtained only based on the mark identifier), the device management unit may determine, based on the identification information table, physical device identifiers respectively corresponding to the mark identifiers of the plurality of computing nodes in the target collaboration group, and then allocate the parallel tasks to the corresponding computing nodes for processing, so that the computing nodes that have a same computing power and are physically interconnected process the parallel tasks of a same type (that is, the computing nodes in the target collaboration group can process the tasks of a same type at the same running rate), thereby improving performance of the computing nodes.

In a possible implementation, each computing node in the target collaboration group is configured to: receive the parallel task allocated by the system management unit; determine whether the physical device identifier corresponding to the parallel task is consistent with a physical device identifier of the computing node in the target collaboration group; and if the physical device identifier corresponding to the parallel task is consistent with the physical device identifier of the computing node in the target collaboration group, execute the parallel task; or if the physical device identifier corresponding to the parallel task is inconsistent with the physical device identifier of the computing node in the target collaboration group, reject to execute the parallel task.

In this embodiment, the computing node may check the received task, that is, check the received task by determining whether the physical device identifier corresponding to the task is consistent with the physical device identifier of the computing node. If the physical device identifier corresponding to the task is consistent with the physical device identifier of the computing node, the computing node may execute the task; or if the physical device identifier corresponding to the task is inconsistent with the physical device identifier of the computing node, the computing node may reject to execute the task, thereby avoiding a problem that the task runs abnormally in the chip management apparatus.

According to a second aspect, an embodiment provides a chip management method, applied to a chip management apparatus. The chip management apparatus includes a device management unit, a system management unit, and N computing nodes. N is an integer greater than 0. The method includes: The device management unit obtains interface information of each of the N computing nodes. The device management unit determines an interconnection relationship between the N computing nodes based on the interface information of each computing node. The system management unit groups, based on the interconnection relationship between the N computing nodes and computing power information of the N computing nodes, the N computing nodes into M first collaboration groups. M is an integer greater than 0. Each of the M first collaboration groups includes at least one computing node, and the at least one computing node included in each first collaboration group has a same computing power and is physically interconnected.

In a possible implementation, the N computing nodes are located in L chips. The device management unit includes L device management subunits, one chip includes one device management subunit, and L is an integer greater than 0 and less than N. That the device management unit obtains interface information of each of the N computing nodes includes: A first device management subunit in the L device management subunits obtains interface information of K computing nodes included in a chip in which the first device management subunit is located, where the first device management subunit is any one of the L device management subunits. That the device management unit determines an interconnection relationship between the N computing nodes based on the interface information of each computing node includes: The first device management subunit determines an interconnection relationship between the K computing nodes based on the interface information of the K computing nodes, where the interconnection relationship between the N computing nodes comprises an interconnection relationship between computing nodes in each of the L chips.

In a possible implementation, the N computing nodes are located in N chips, the N chips are cascaded on a chip board, the chip board includes the device management unit, and the interconnection relationship between the N computing nodes comprises an interconnection relationship between the N chips.

In a possible implementation, a plurality of applications are run on the N computing nodes, and the method further includes: The system management unit pre-groups the N computing nodes, where each pre-group includes a plurality of computing nodes that are capable of running a same application; and sends pre-grouping information of the N computing nodes to the device between the N computing nodes based on the pre-grouping information of the N computing nodes and the interface information of the N computing nodes.

In a possible implementation, the method further includes: The device management unit obtains a first identification information table from a target computing node, where the target computing node is any one of the N computing nodes; and associates, based on the first identification information table, a plurality of interconnected computing nodes in the N computing nodes.

In a possible implementation, each of the N computing nodes has one physical device identifier. The method further includes: Each of the N computing nodes generates one mark identifier, where each of the N computing nodes corresponds to a different mark identifier; and establishes a first mapping relationship between the mark identifier and the physical device identifier.

In a possible implementation, the method further includes: The system management unit obtains the first mapping relationship of each of the N computing nodes; and generates the first identification information table, where the first identification information table includes the first mapping relationship of each of the N computing nodes.

In a possible implementation, the method further includes: The system management unit sends the first identification information table to each of the N computing nodes. Each of the N computing nodes stores the first identification information table.

In a possible implementation, the method further includes: The system management unit groups interconnected computing nodes that have a same computing power and a same function into one first collaboration group.

In a possible implementation, the method further includes: The system management unit selects a target collaboration group from the M first collaboration groups based on a computing power requirement required by a to-be-executed task, where the to-be-executed task includes a plurality of parallel tasks; and respectively allocates the plurality of parallel tasks to a plurality of computing nodes based on mark identifiers of the plurality of computing nodes in the target collaboration group.

In a possible implementation, the method further includes: The device management unit determines, based on the first identification information table, physical device identifiers respectively corresponding to the mark identifiers of the plurality of computing nodes in the target collaboration group; and respectively allocates, based on the physical device identifiers respectively corresponding to the plurality of computing nodes, the plurality of parallel tasks to the corresponding computing nodes, where one parallel task corresponds to one physical device identifier.

In a possible implementation, the method further includes: Each computing node in the target collaboration group receives the parallel task allocated by the system management unit; determines whether the physical device identifier corresponding to the parallel task is consistent with a physical device identifier of the computing node in the target collaboration group; and if the physical device identifier corresponding to the parallel task is consistent with the physical device identifier of the computing node in the target collaboration group, executes the parallel task; or if the physical device identifier corresponding to the parallel task is inconsistent with the physical device identifier of the computing node in the target collaboration group, rejects to execute the parallel task.

According to a third aspect, a terminal device has a function of implementing any one of the foregoing chip management methods. The function may be implemented by hardware, or may be implemented by hardware executing corresponding software. The hardware or the software includes one or more modules corresponding to the function.

According to a fourth aspect, a terminal device includes a processor, and the processor is configured to support the terminal device in performing a corresponding function in the chip management method provided in the second aspect. The terminal device may further include a memory. The memory is configured to be coupled to the processor, and stores program instructions and data that are for the terminal device. The terminal device may further include a communication interface configured to implement communication between the terminal device and another device or a communication network.

According to a fifth aspect, an embodiment provides a computer program. The computer program includes instructions, and when the computer program is executed by a computer, the computer can perform a procedure in any one of the chip management methods in the second aspect.

According to a sixth aspect, a chip management apparatus includes a processor configured to support an application server or a terminal device in implementing a function in the second aspect, for example, generating or processing information in the foregoing method. In a possible design, the chip management apparatus further includes a memory, and the memory is configured to store program instructions and data that are for a data sending device. The chip management apparatus may include a chip, or may include the chip and another discrete device.

According to a seventh aspect, a semiconductor chip includes the chip management apparatus in any one of the first aspect.

According to an eighth aspect, an electronic device includes the semiconductor chip in the seventh aspect.

BRIEF DESCRIPTION OF THE DRAWINGS

FIG. 8 is a diagram of a first identification information table according to an embodiment;

DETAILED DESCRIPTION

The following describes embodiments with reference to accompanying drawings in embodiments.

In the specification, claims, and accompanying drawings, the terms "first", "second", "third", "fourth" and so on are intended to distinguish between different objects but do not indicate a particular order. In addition, the terms "including" and "having" and any other variants thereof are intended to cover a non-exclusive inclusion. For example, processes, methods, systems, products, or devices that include a series of steps or units are not limited to the listed steps or units, but optionally further includes an unlisted step or unit, or optionally further includes another inherent step or unit of these processes, methods, products, or devices.

"An embodiment" mentioned in the specification indicates that a particular characteristic, structure or feature described with reference to this embodiment may be included in at least one embodiment. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

The following describes embodiments with reference to the accompanying drawings.

Figure 1A:
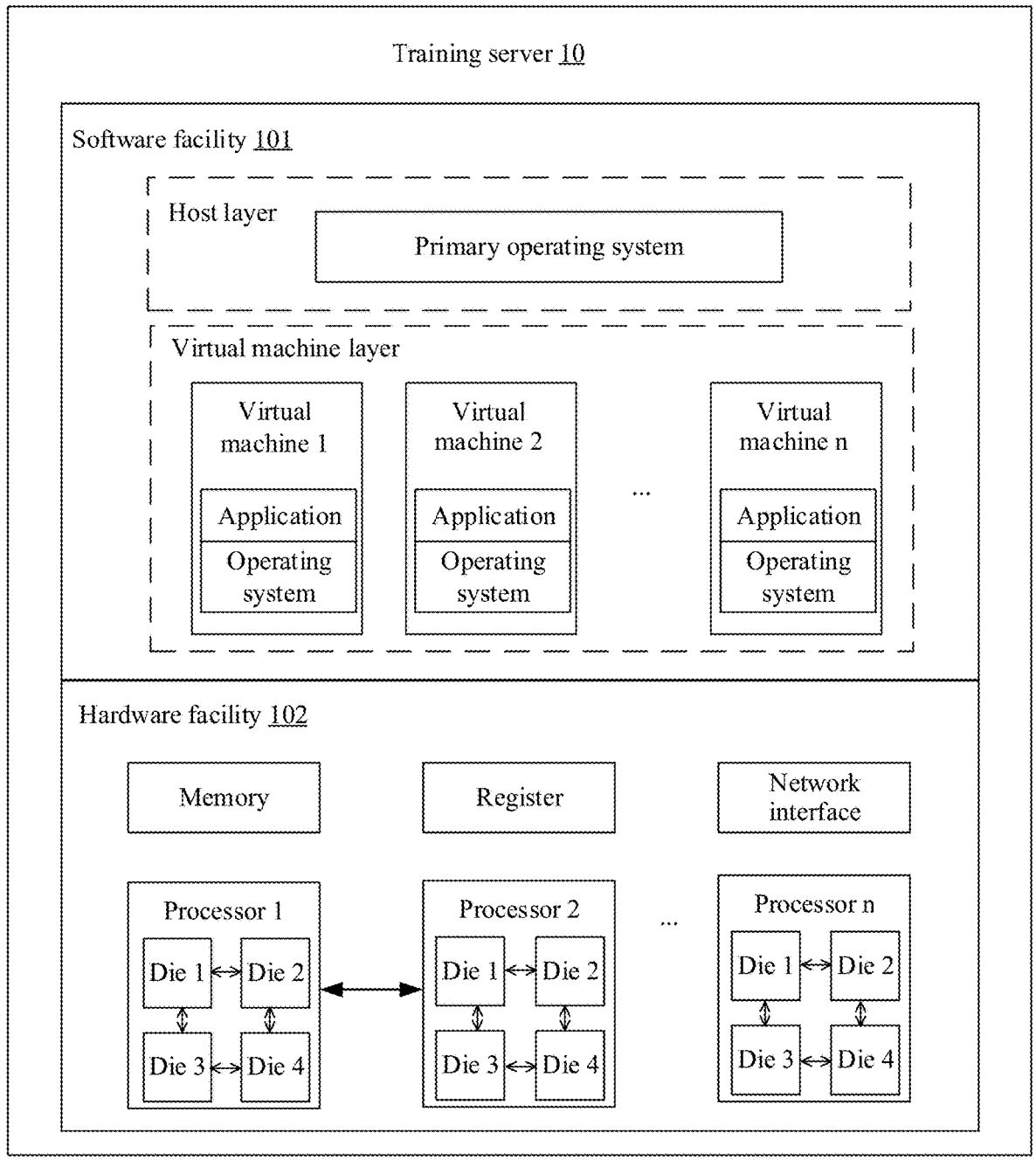
FIG. 1A is a diagram of an architecture of a training server according to an embodiment.

Based on the foregoing technical problem, to facilitate understanding of embodiments, the following first describes an architecture that is of a training server and on which embodiments are based. FIG. 1A is a diagram of an architecture of a training server according to an embodiment. A training server 10 can train a service (for example, train a deep learning model) with higher training efficiency. The training server 10 may include a software facility 101 and a hardware facility 102.

The software facility 101 provides a most basic function for use by the training server, but is not intended for a particular application field. The software facility 101 may include a host layer and a virtual machine layer. A primary operating system is run on the host layer, and the primary operating system is a computer program that manages hardware and software resources of the server. The primary operating system needs to handle basic transactions, for example, delivering a task (for example, a computing task) to a hardware resource, managing and configuring a memory, determining a priority of a system resource supply and demand, controlling input and output devices, operating a network, and managing a file system. The primary operating system also provides an operation interface for a user to interact with a system. The virtual machine layer may include a plurality of virtual machines, such as a virtual machine 1 and a virtual machine 2 in FIG. 1A, and each virtual machine may run different operating systems (such as a Windows system, a Unix system, and a Linux system) and applications, so that the virtual machine can provide various services externally. It should be noted that all resources used by the virtual machine come from a host, and the host provides its own resources, such as a virtual machine processor, a virtual machine cluster file system, a virtual network interface card and a switch, a storage protocol stack, a network protocol stack, and a device driver, for the virtual machine for use in a sharing manner. The virtual machine can use virtualization software (such as kernel-based virtual machine (KVM) or Xen), to logically assemble hardware resources on a hardware server as required. The virtual machine runs on the primary operating system and is a process running on the primary operating system.

Figure 1B:
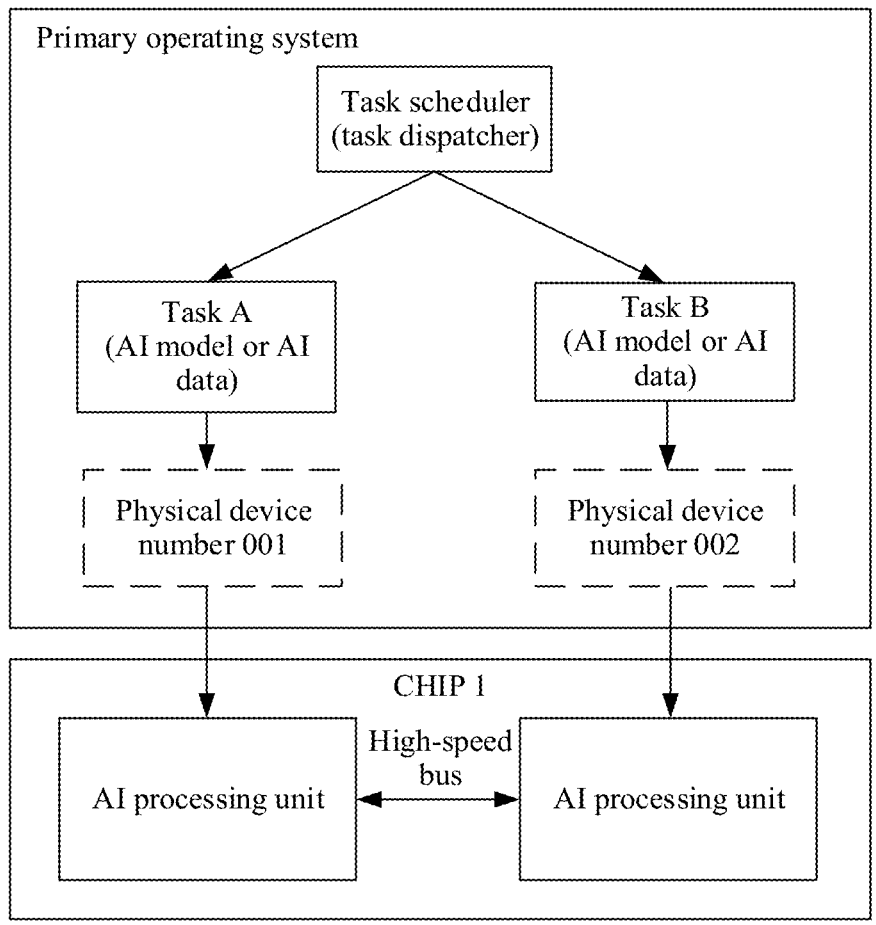
FIG. 1B is a diagram of system task allocation in a technology.

The hardware facility 102 forms an organic whole based on a system structure requirement, and provides a material basis for running of software of the training server. The hardware facility 102 may include a processor, a memory, a register, a network interface, and the like. The processor may be a central processing unit (CPU), a graphics processing unit (GPU), an artificial intelligence (AI) processor, a network processor (NPU), or the like. The processor is an operation and control core of a computer system, and is a final execution unit for information processing and program running. A function of the processor is mainly to interpret computer instructions and process data in computer software. One training server may include a plurality of processors, and the plurality of processors may be interconnected through a bus. In addition, the training server may further provide a plurality of extended slots, so that a user may externally connect to hardware resources such as another processor, so that a function of the training server is more powerful. In addition, one processor may include one processing unit, or may include a plurality of processing units. Each processing unit may be formed by using a die, and different processing units may be interconnected through a bus. The processor may be implemented as one or more microprocessors, microcomputers, microcontrollers, digital signal processors, central processing units, state machines, logic circuits, and/or any devices that process signals based on operational instructions. In addition to other functions, the processor is configured to obtain and execute computer-readable instructions and data stored in the memory. It should be noted that each processing unit in the processor has one physical device identifier (the physical device identifier is allocated by a hardware manufacturer that uses a chip or a system that uses the chip), and a user may obtain a hardware resource of a corresponding processing unit based on the physical device identifier. When the system (which may be the primary operating system or the operating system running on the virtual machine) needs to invoke the hardware resource of the processor, the system may deliver a task to the processing unit based on a physical device number, so that a hardware processing unit processes a corresponding task. For example, FIG. 1B is a diagram of system task allocation according to the technology. In the figure, a system is a primary operating system, and when a to-be-processed task exists in the primary operating system, a task scheduler (or a task dispatcher) may allocate a task A (which may be an AI model or AI data) to an AI processing unit whose physical device number is 001 for processing, and allocate a task B to an AI processing unit whose physical device number is 002 for processing. The memory is a memory component configured to store a program and various data information, and may include any computer-readable medium well known in the art. A function of the register is to store binary code, and the register is composed of triggers that have storage functions. The network interface refers to various interfaces on a network device. Optionally, the hardware facility further includes hardware such as an input/output (I/O) device, a hard disk, and a network adapter.

It may be understood that the architecture of the training server in FIG. 1A is merely an example implementation in embodiments, and the architecture of the training server in embodiments includes but is not limited to the foregoing architecture.

The following describes embodiments with reference to accompanying drawings in embodiments.

Figure 2:
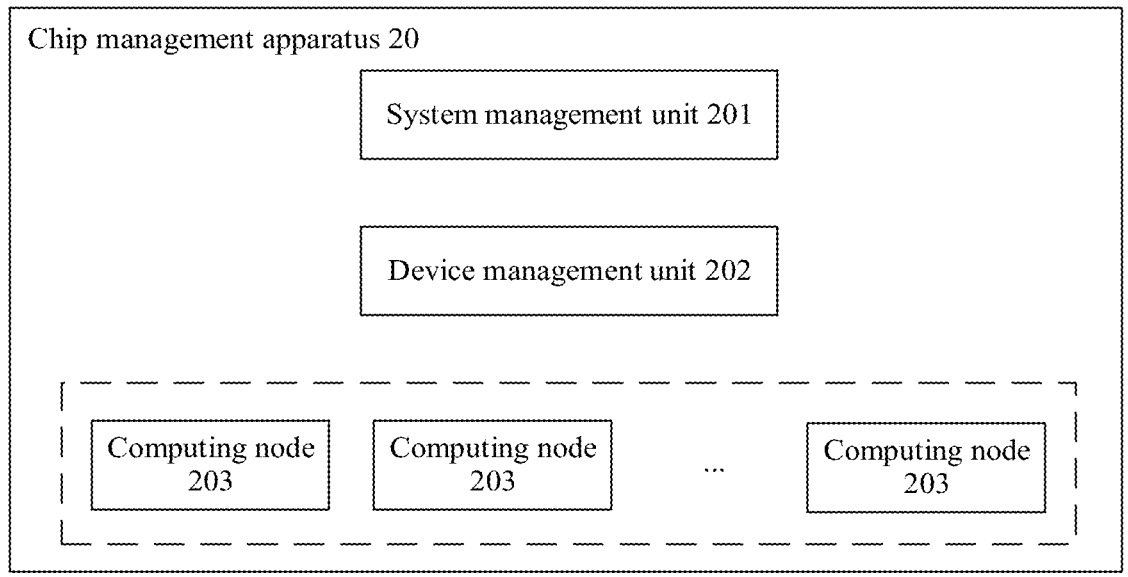
FIG. 2 is a diagram of a chip management apparatus according to an embodiment.

FIG. 2 is a diagram of a chip management apparatus according to an embodiment. The following describes the chip management apparatus in this embodiment in detail with reference to FIG. 2. As shown in FIG. 2, a chip management apparatus 20 includes a system management unit 201, a device management unit 202, and N computing nodes 203. N is an integer greater than 0.

The device management unit 202 is configured to: obtain interface information of each of the N computing nodes; and determine an interconnection relationship between the N computing nodes based on the interface information of the N computing nodes. Specifically, the chip management apparatus 20 may be applied to the training server in FIG. 1A, or may be applied to another type of server. The system management unit 201 in the chip management apparatus 20 may be implemented through a hardware circuit, and may be located in a CPU configured to run a system operation program, and the like. The device management unit 202 may also be implemented through a hardware circuit, and may be located in a dedicated chip, for example, a GPU, or may exist in the chip management apparatus 20 as a new functional module, which is not limited herein. The N computing nodes 203 may be hardware resources of the training server in FIG. 1A. The computing node may be a physical chip, or may be a die in the physical chip, or may be a device obtained through computing power allocation. In other words, the computing node may be an AI processing unit having an independent AI processing capability. In addition, the physical chip may be an AI processing chip, a common computing processing chip, or various chip processors such as video decoding. The interface information of each computing node may be understood as information about a physical connection between the computing node and another hardware module. The interface information of the N computing nodes may be understood as information obtained after interface information of a plurality of computing nodes is summarized. The interconnection relationship between the computing nodes may be understood as that the computing nodes are adjacent and connected through a high-speed bus.

Figure 3:
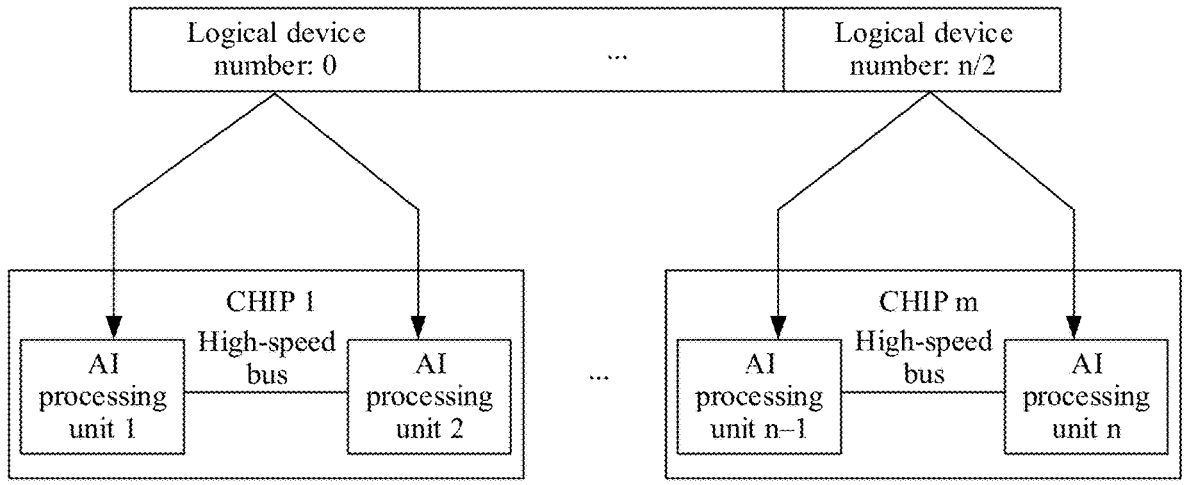
FIG. 3 is a diagram of a collaboration group of computing nodes according to an embodiment.

The system management unit 201 is configured to: group, based on the interconnection relationship between the N computing nodes and computing power information of the N computing nodes, the N computing nodes into M first collaboration groups, where M is an integer greater than 0, each of the M first collaboration groups includes at least one computing node, and the at least one computing node included in each first collaboration group has a same computing power and is physically interconnected. Specifically, the system management unit 201 may obtain the physical interconnection relationship between the N computing nodes via the device management unit 202, and then the system management unit 201 may group the computing nodes based on the physical interconnection relationship between the N computing nodes and the computing power information of the N computing nodes (that is, computing rate information of the computing nodes), so that computing nodes that have a same computing power and physically interconnected are in one collaboration group. It may be understood that a plurality of physically interconnected AI processing units with equal computing powers are packaged into one logical AI processor with larger computing power and larger memory, to support larger model training and sample data processing. For example, FIG. 3 is a diagram of a collaboration group of computing nodes according to an embodiment. In the figure, it is assumed that N computing nodes are AI processing units (which may be one die in a chip) in a chip. The device management unit 202 may separately obtain interface information of the N AI processing units, and determine a physical interconnection relationship between the AI processing units. For example, the device management unit 202 may determine that an AI processing unit 1 and an AI processing unit 2 are connected through a high-speed bus, and an AI processing unit n−1 and an AI processing unit n are connected through a high-speed bus. It is also assumed that the AI processing unit 1 and the AI processing unit 2 have a same computing power, and the AI processing unit n−1 and the AI processing unit n have a same computing power. Further, the system management unit 201 may group the AI processing unit 1 and the AI processing unit 2 into one collaboration group, and group the AI processing unit n−1 and the AI processing unit n into another collaboration group based on the physical interconnection relationship and computing power information between the AI processing units. Optionally, the collaboration group of the AI processing unit 1 and the AI processing unit 2 is marked by a logical device number 0, and the collaboration group of the AI processing unit n−1 and the AI processing unit n is marked by a logical device number n/2.

In this example, other AI processing units may be grouped in a same manner, and details are not described herein again.

It should be noted that, in a virtual machine running scenario, for a plurality of computing nodes that are used in a same virtual machine by using a high-speed serial computer extension bus standard (Peripheral Component Interconnect Express (PCIe)) direct connection mechanism, the N computing nodes may also be grouped for use in the foregoing manner.

Figure 4:
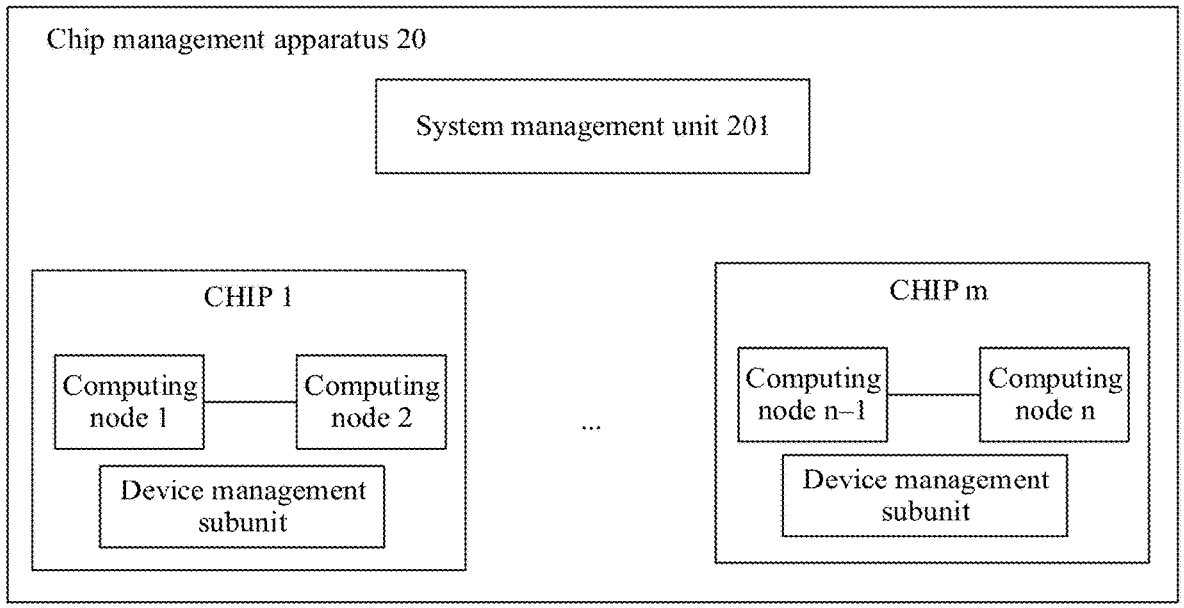
FIG. 4 is a diagram of another chip management apparatus according to an embodiment.

In a possible implementation, the N computing nodes 203 are located in L chips. The device management unit 202 includes L device management subunits, one chip includes one device management subunit, and L is an integer greater than 0 and less than N. A first device management subunit in the L device management subunits is configured to: obtain interface information of K computing nodes included in a chip in which the first device management subunit is located; and determine an interconnection relationship between the K computing nodes based on the interface information of the K computing nodes, where the interconnection relationship between the N computing nodes includes an interconnection relationship between computing nodes in each of the L chips. Next, description is made with reference to FIG. 4. FIG. 4 is a diagram of another chip management apparatus according to an embodiment. In the figure, the chip management apparatus 20 may include a plurality of chips, and each chip may further include a plurality of computing nodes (for example, one computing node may be one die in the chip). In other words, N computing nodes 203 included in the chip management apparatus 20 are located in L chips, where L is greater than 0 and less than N. Quantities of computing nodes included in each chip may be the same, or may be different. In this case, if the device management unit 202 includes a plurality of device management subunits, and the plurality of device management subunits are distributed in different chips. Each device management subunit is configured to obtain interface information of a plurality of computing nodes included in a chip on which the device management subunit is located, and determine a physical interconnection relationship between the plurality of computing nodes, so that the physical interconnection relationship between the N computing nodes in the chip management apparatus can be obtained more conveniently and efficiently.

Figure 5:
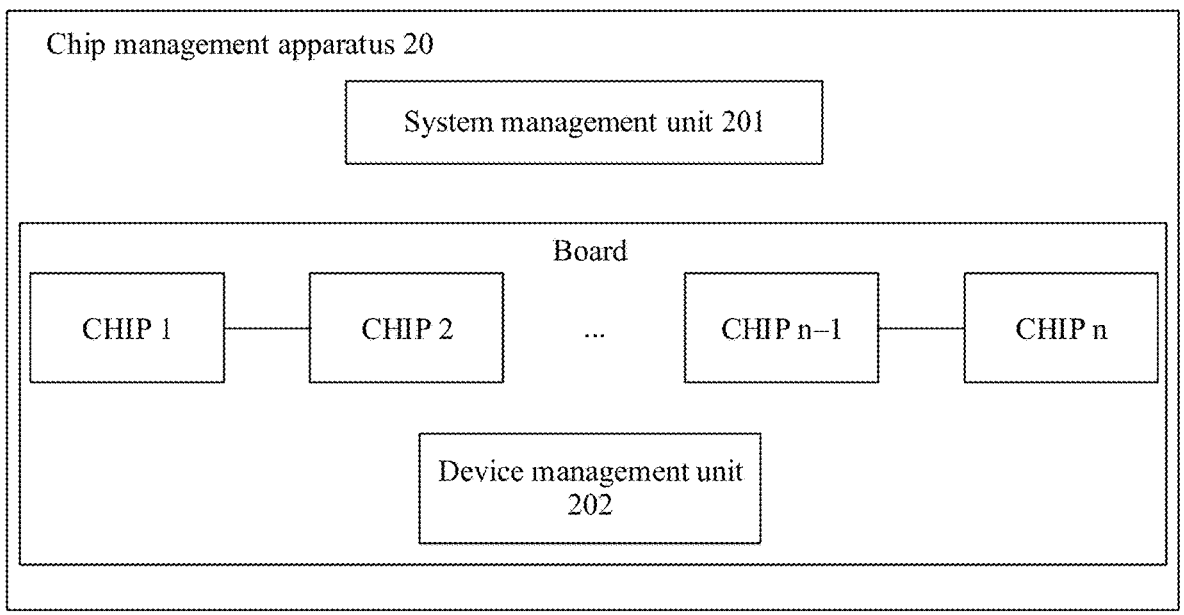
FIG. 5 is a diagram of still another chip management apparatus according to an embodiment.

In a possible implementation, the N computing nodes 203 are located in N chips, the N chips are cascaded on a chip board, the chip board includes the device management unit 202, and the interconnection relationship between the N computing nodes 203 is an interconnection relationship between the N chips. Next, description is made with reference to FIG. 5. FIG. 5 is a diagram of still another chip management apparatus according to an embodiment. In the figure, the chip management apparatus 20 may include a plurality of chips, and each chip includes only one computing node (which may also be understood as one chip is one computing node). In this case, the device management unit 202 is configured to obtain an interface relationship of each chip, and determine a physical interconnection relationship between the chips, so that the physical interconnection relationship between the N computing nodes in the chip management apparatus can be more accurately obtained.

In a possible implementation, a plurality of applications are run on the N computing nodes 203, and the system management unit 201 is further configured to: pre-group the N computing nodes, where each pre-group includes a plurality of computing nodes that are capable of running a same application; and send pre-grouping information of the N computing nodes to the device management unit 202. The device management unit 202 is further configured to determine the interconnection relationship between the N computing nodes based on the pre-grouping information of the N computing nodes and the interface information of each computing node. Specifically, when the N computing nodes in the chip management apparatus 20 are configured to run different applications, even if computing nodes that run the different applications are interconnected through a high-speed bus, resource sharing cannot be performed (that is, data transmission cannot be performed between the computing nodes). However, because the device management unit 202 cannot actively sense which computing nodes need to run a same application, the system management unit 201 may first pre-group the computing nodes that need to run the same application, and then the system management unit 201 sends pre-grouping information to the device management unit 202, so that the device management unit 202 can determine, based on the pre-grouping information, the computing nodes that need to run the same application, and determine that the plurality of computing nodes that are interconnected through a high-speed bus and that need to run the same application have an interconnection relationship. This avoids a problem that the device management unit 202 cannot sense which computing nodes can run the same application, and determines that the plurality of computing nodes that run the different applications have an interconnection relationship, so that these computing nodes cannot normally run parallel tasks. This improves processing performance of the computing nodes. For example, one AI training task may be distributed in a plurality of applications for processing, and the plurality of applications may share a same hardware resource (that is, the N computing nodes). However, after one computing node is occupied by one application, another application cannot use the computing node, and computing nodes that run different applications cannot share a resource (that is, data transmission cannot be performed between the computing nodes). Therefore, when a physical interconnection relationship between the computing nodes is determined, whether the computing nodes are interconnected through a high-speed bus needs to be considered, and whether the computing nodes need to run a same application also needs to be considered.

In a possible implementation, the interconnection relationship is the high-speed bus interconnection relationship between the computing nodes that run the same application. Specifically, it is assumed that two computing nodes have a physical interconnection relationship. It may be understood that the two computing nodes are connected through a high-speed bus, and a same application may be run on the two computing nodes. When data synchronization is performed between the two computing nodes, data is transmitted through the high-speed bus, and data synchronization efficiency is high.

In a possible implementation, the device management unit 202 is further configured to: obtain a first identification information table from a target computing node, where the target computing node is any one of the N computing nodes; and associate, based on the first identification information table, a plurality of interconnected computing nodes in the N computing nodes. Specifically, the device management unit 202 may obtain an identification information table, and associate a plurality of interconnected computing nodes in the information table, so that the device management unit can more accurately mark an interconnection relationship between the computing nodes.

Figure 6:
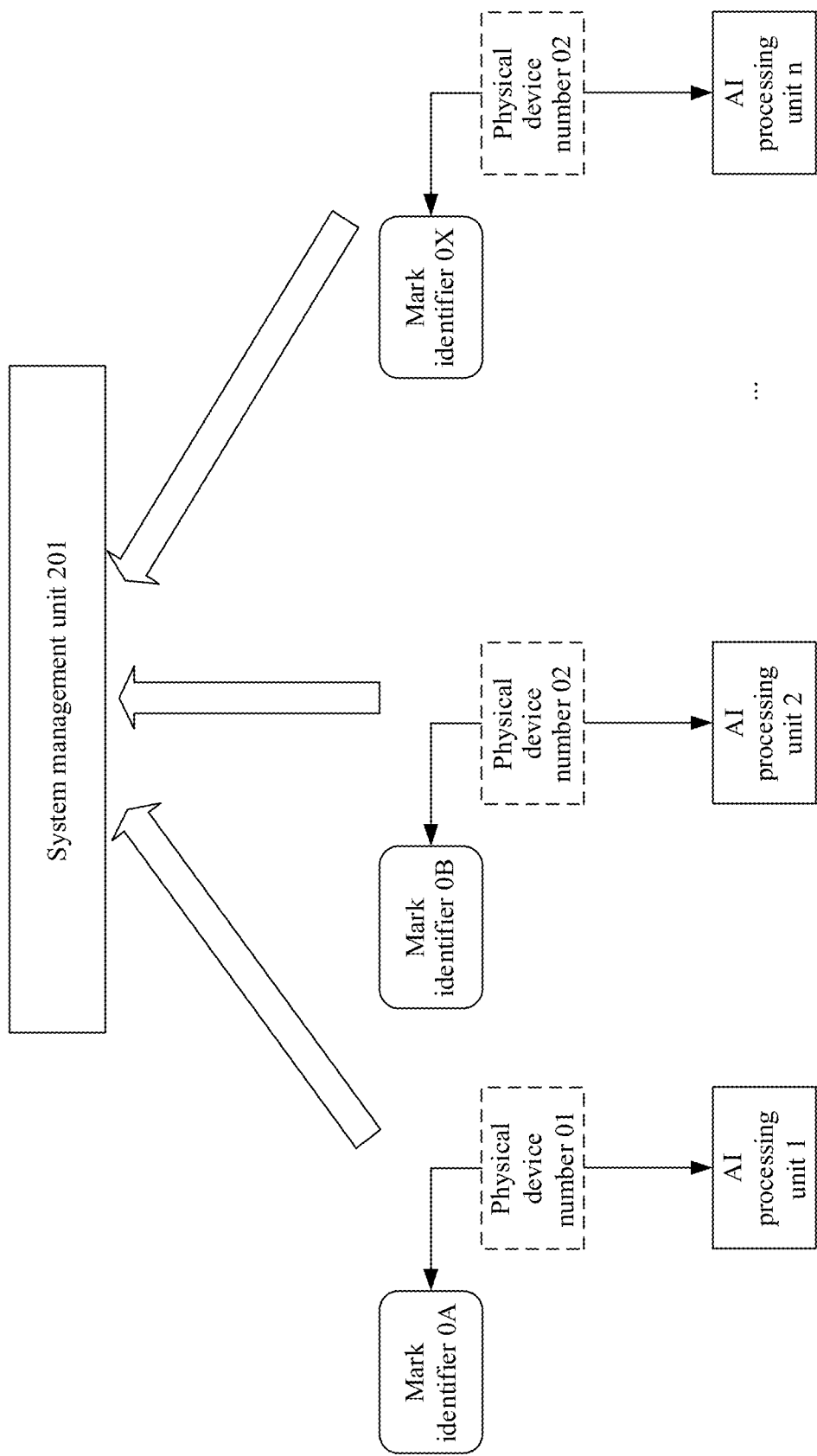
FIG. 6 is a diagram of a first mapping relationship of computing nodes according to an embodiment.

In a possible implementation, each of the N computing nodes 203 has one physical device identifier, and each of the N computing nodes 203 is configured to: generate one mark identifier for the computing node based on a preset algorithm, where each of the N computing nodes 203 corresponds to a different mark identifier; and establish a first mapping relationship between the mark identifier and the physical device identifier. Specifically, each computing node has one physical device identifier (the physical device identifier is allocated by a hardware manufacturer that uses a chip or a system that uses the chip), and a user may obtain a hardware resource of a corresponding computing node based on the physical device identifier. The physical device identifier is one device symbol index corresponding to each virtual function (VF) or physical function (PF) discovered by a PCIe driver through PCIe scanning, and one device symbol index generally corresponds to one device (for example, the computing node). However, because hardware manufacturers that use chips may be different, it cannot be ensured that physical device identifiers and computing nodes in the chip are in a one-to-one correspondence in different hardware manufacturers or in different systems. In different systems, a same physical device identifier may correspond to different computing nodes. To avoid such problem, each computing node in the chip management apparatus 20 may generate a globally unique mark identifier for the computing node based on a preset algorithm (for example, a random algorithm), and then establish a mapping relationship between the mark identifier and a physical device identifier, so that each computing node in the chip management apparatus 20 corresponds to one unique identifier. Further, the physical interconnection relationship between the computing nodes may be established based on the identifier, so that the physical interconnection relationship between the N computing nodes in the chip management apparatus can be obtained more accurately. For example, FIG. 6 is a diagram of a first mapping relationship of computing nodes according to an embodiment. In the figure, it is assumed that N computing nodes are respectively an AI processing unit 1, an AI processing unit 2, and an AI processing unit n. A physical device identifier of the AI processing unit 1 is 01, a physical device identifier of the AI processing unit 2 is 02, and a physical device identifier of the AI processing unit n is 02. Because the physical device identifier of the AI processing unit 2 is the same as the physical device identifier of the AI processing unit n, the AI processing unit 1 or the AI processing unit n cannot be accurately found based on only the physical device identifier 02. To resolve this problem, each AI processing unit may generate a globally unique mark identifier based on a preset algorithm. For example, a mark identifier generated by the AI processing unit 1 is 0A, a mark identifier generated by the AI processing unit 2 is 0B, and a mark identifier generated by the AI processing unit n is 0X, and a mapping relationship between the mark identifier and the physical device identifier is established, so that the AI processing unit 1 and the AI processing unit n can be distinguished based on different mark identifiers.

In a possible implementation, the system management unit 201 is further configured to: obtain the first mapping relationship of each of the N computing nodes 203; and generate the first identification information table, where the first identification information table includes the first mapping relationship of each of the N computing nodes. Specifically, the system management unit 201 in the chip management apparatus 20 may uniformly collect mapping relationships between the physical device identifiers and the mark identifiers of the computing nodes, and generate an identifier information table based on these mapping relationships. In this way, the system management unit 201 can accurately distinguish different computing nodes when performing collaborative grouping. In addition, the device management unit 202 can more accurately mark an interconnection relationship between the computing nodes based on the identification information table. Optionally, after generating the mark identifier of each computing node, each computing node may store the mark identifier in a shared memory, so that the system management unit 201 may read a corresponding mark identifier from the shared memory of each computing node. For example, as shown in FIG. 6, in the figure, the system management unit 201 may separately obtain a first mapping relationship (0A–01) of the AI processing unit 1, a first mapping relationship (0B–02) of the AI processing unit 2, and a first mapping relationship (0X–02) of the AI processing unit n, and generate an identification information table. The identification information table is used to record a first mapping relationship of each AI processing unit.

In a possible implementation, the system management unit 201 is further configured to: send the first identification information table to each of the N computing nodes 203. Each of the N computing nodes 203 is further configured to store the first identification information table. Specifically, the system management unit 201 in the chip management apparatus 20 may further send the mapping relationships (that is, the identification information table) between the physical device identifiers and the mark identifiers of the computing nodes to each computing node, so that each computing node can store the identification information table, so as to avoid a user from randomly modifying the mapping relationship between the physical device identifier and the mark identifier of each computing node. In addition, the system management unit 201 can synchronize the mark identifier of each computing node more conveniently and efficiently among the computing nodes. If the system management unit 201 does not synchronize the identification information table between the computing nodes, when the plurality of computing nodes are used in the virtual machine, because software (including an operating system (OS)) in the virtual machine is completely controlled by a user, it cannot be ensured that the mapping relationship between the physical device identifier and the mark identifier of the computing node is not modified.

Figure 7:
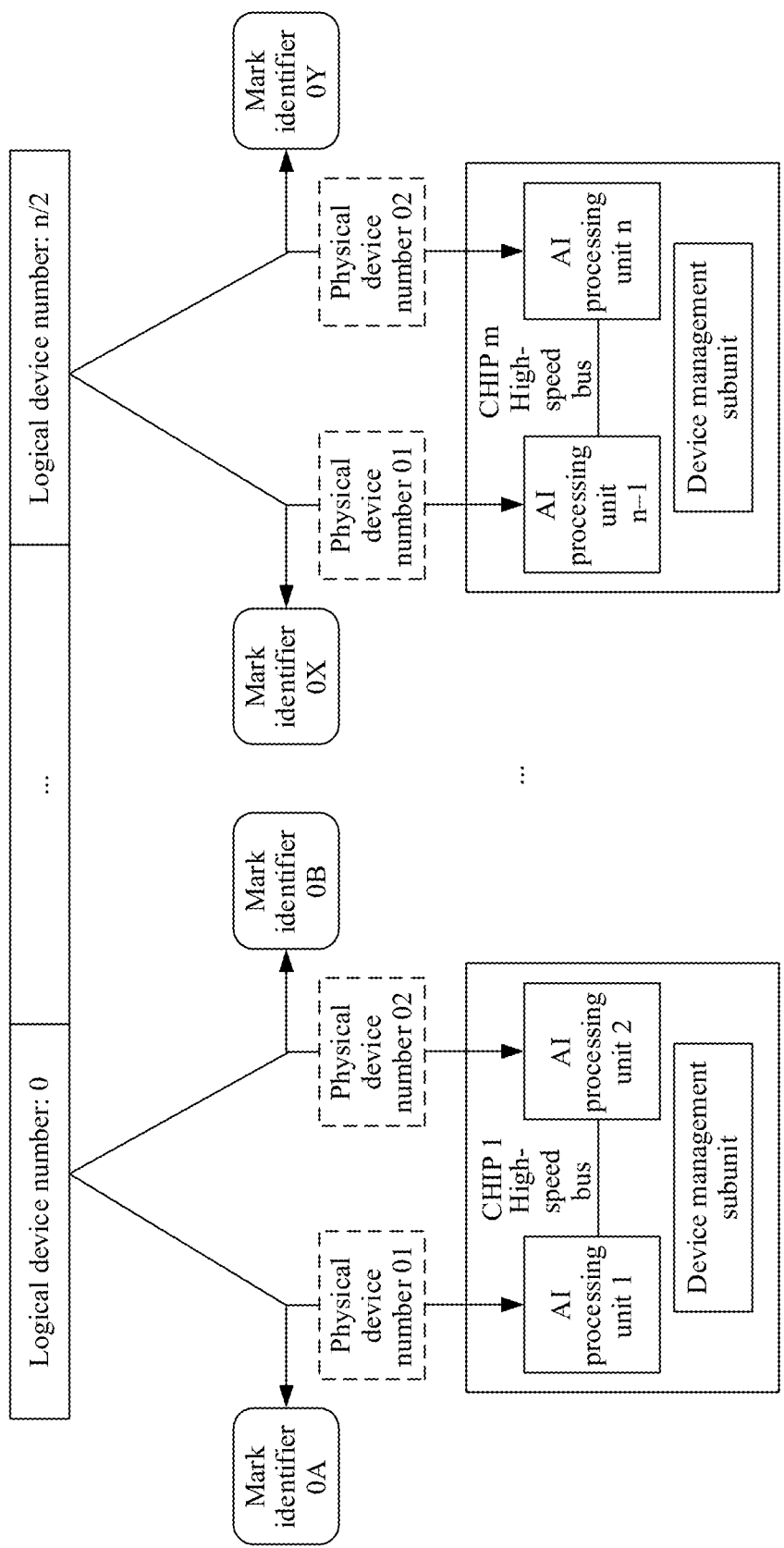
FIG. 7 is a diagram of a mark identifier association according to an embodiment.

In a possible implementation, the device management unit 202 is further configured to: obtain the first identification information table from the target computing node based on the physical device identifier of the target computing node; and associate, based on the first identification information table, mark identifiers of the interconnected computing nodes in the N computing nodes 203. Specifically, because each computing node stores the identification information table (the identification information table records the mark identifiers of the computing nodes), the device management unit 202 may obtain the identification information table based on a physical device identifier of any computing node, and then associate mark identifiers of physically interconnected computing nodes, thereby avoiding a case in which one physical device identifier corresponds to a plurality of computing nodes when the physical device identifiers of the computing nodes are used for association. In this way, the device management unit 202 can more accurately mark the interconnection relationship between the computing nodes. For example, FIG. 7 is a diagram of mark identifier association according to an embodiment. In the figure, it is assumed that N computing nodes are N AI processing units, a chip 1 includes an AI processing unit 1 and an AI processing unit 2, and the two AI processing units are interconnected through a high-speed bus. FIG. 8 is a diagram of a first identification information table according to an embodiment. In the figure, a device management subunit in a chip 1 may establish an interconnection relationship between a mark identifier 0A of an AI processing unit 1 and a mark identifier 0B of an AI processing unit 2 based on the identification information table. Similarly, in FIG. 7, a device management subunit in a chip m may establish an interconnection relationship between a mark identifier 0X of an AI processing unit n−1 and a mark identifier 0Y of an AI processing unit n. The device management unit 202 in this embodiment can accurately mark the interconnection relationship between the computing nodes.

In a possible implementation, the system management unit 201 is further configured to group interconnected computing nodes that have a same computing power and a same function into one first collaboration group. Specifically, the system management unit 201 in the chip management apparatus 20 may group physically interconnected computing nodes that have a same computing power and a same function into one collaboration group based on the interconnection relationship that is obtained by the device management unit 202 and that is of the mark identifiers between the plurality of computing nodes and computing power information and function information of the plurality of computing nodes. Further, when allocating the parallel tasks, the system management unit 201 may allocate the parallel tasks to the plurality of computing nodes that have a same function, a same computing power, and are connected through a high-speed bus for parallel processing. This avoids a problem in the technology that the system management unit 201 cannot sense whether the physical locations of the computing nodes are adjacent and the computing nodes are interconnected through the high-speed bus, and allocates the parallel tasks to the computing nodes that have a same computing power but are far away from each other and have the small interconnection bandwidth for processing, and when data synchronization is performed between the computing nodes that execute the parallel tasks, performance of the computing nodes is reduced. This improves processing performance of the computing nodes.

In a possible implementation, the system management unit 201 is further configured to: select a target collaboration group from the M first collaboration groups based on a computing power requirement required by a to-be-executed task, where the to-be-executed task includes a plurality of parallel tasks; and respectively allocate the plurality of parallel tasks to a plurality of computing nodes based on mark identifiers of the plurality of computing nodes in the target collaboration group. Specifically, when allocating to-be-executed tasks (including a plurality of parallel tasks), the system management unit 201 in the chip management apparatus 20 may first select one target collaboration group from a plurality of collaboration groups based on computing powers required by the to-be-executed tasks, and then allocate, based on mark identifiers of a plurality of computing nodes included in the target collaboration group, the plurality of parallel tasks to the plurality of computing nodes for processing, so that the computing nodes that have a same computing power and are physically interconnected process parallel tasks of a same type (that is, the computing nodes in the target collaboration group can process tasks of a same type at a same running rate), thereby improving performance of the computing nodes. For example, as shown in FIG. 7, it is assumed that a collaboration group whose logical device number is 0 includes two AI processing units, and computing powers of the two AI processing units are both 800. It is also assumed that one to-be-executed task includes two parallel tasks, and each parallel task needs to be processed by an AI processing unit with 800 computing powers. In this case, the system management unit 201 may select, from a plurality of first collaboration groups, the collaboration group whose logical device number is 0 as the target collaboration group, and then respectively allocate, based on a mark identifier of each AI processing unit (for example, a mark identifier of an AI processing unit 1 is 0A, and a mark identifier of an AI processing unit 2 is 0B), the parallel tasks to the AI processing unit 1 and the AI processing unit 2 for processing.

In a possible implementation, the device management unit 202 is further configured to: determine, based on the first identification information table, physical device identifiers respectively corresponding to the mark identifiers of the plurality of computing nodes in the target collaboration group; and respectively allocate, based on the physical device identifiers respectively corresponding to the plurality of computing nodes, the plurality of parallel tasks to the corresponding computing nodes, where one parallel task corresponds to one physical device identifier. Specifically, because the hardware resource of the computing node can be obtained only based on the physical device identifier of the computing node (that is, the hardware resource of the computing node cannot be obtained only based on the mark identifier), the device management unit 202 may determine, based on the identification information table, physical device identifiers respectively corresponding to the mark identifiers of the plurality of computing nodes in the target collaboration group, and then allocate the parallel tasks to the corresponding computing nodes for processing, so that the computing nodes that have a same computing power and are physically interconnected process the parallel tasks of a same type (that is, the computing nodes in the target collaboration group can process the tasks of a same type at the same running rate), thereby improving performance of the computing nodes. For example, as shown in FIG. 7, when the system management unit 201 respectively allocates, based on the mark identifier of each AI processing unit (for example, the mark identifier of the AI processing unit 1 is 0A, and the mark identifier of the AI processing unit 2 is 0B), the parallel tasks to the AI processing unit 1 and the AI processing unit 2 for processing, it may be determined, by using the device management unit (for example, a device management subunit in the chip 1), that physical device identifiers corresponding to the mark identifier of the AI processing unit 1 and the mark identifier of the AI processing unit 2 are respectively 01 and 02. Therefore, hardware resources of the AI processing unit 1 and the AI processing unit 2 are obtained based on the physical device identifier 01 and the physical device identifier 02.

In a possible implementation, each computing node in the target collaboration group is configured to: receive the parallel task allocated by the system management unit 201; determine whether the physical device identifier corresponding to the parallel task is consistent with a physical device identifier of the computing node in the target collaboration group; and if the physical device identifier corresponding to the parallel task is consistent with the physical device identifier of the computing node in the target collaboration group, execute the parallel task; or if the physical device identifier corresponding to the parallel task is inconsistent with the physical device identifier of the computing node in the target collaboration group, reject to execute the parallel task. Specifically, the computing node may check the received task, that is, check the received task by determining whether the physical device identifier corresponding to the task is consistent with the physical device identifier of the computing node. If the physical device identifier corresponding to the task is consistent with the physical device identifier of the computing node, the computing node may execute the task; or if the physical device identifier corresponding to the task is inconsistent with the physical device identifier of the computing node, the computing node may reject to execute the task, thereby avoiding a problem that the task runs abnormally in the chip management apparatus.

In this embodiment, this avoids a problem in the technology that the system management unit cannot sense whether the physical locations of the computing nodes are adjacent and the computing nodes are interconnected through the high-speed bus, and allocates the parallel tasks to the computing nodes that have a same computing power but are far away from each other and have the small interconnection bandwidth for processing, and when data synchronization is performed between the computing nodes that execute the parallel tasks, performance of the computing nodes is reduced. This improves processing performance of the computing nodes.

Figure 9:
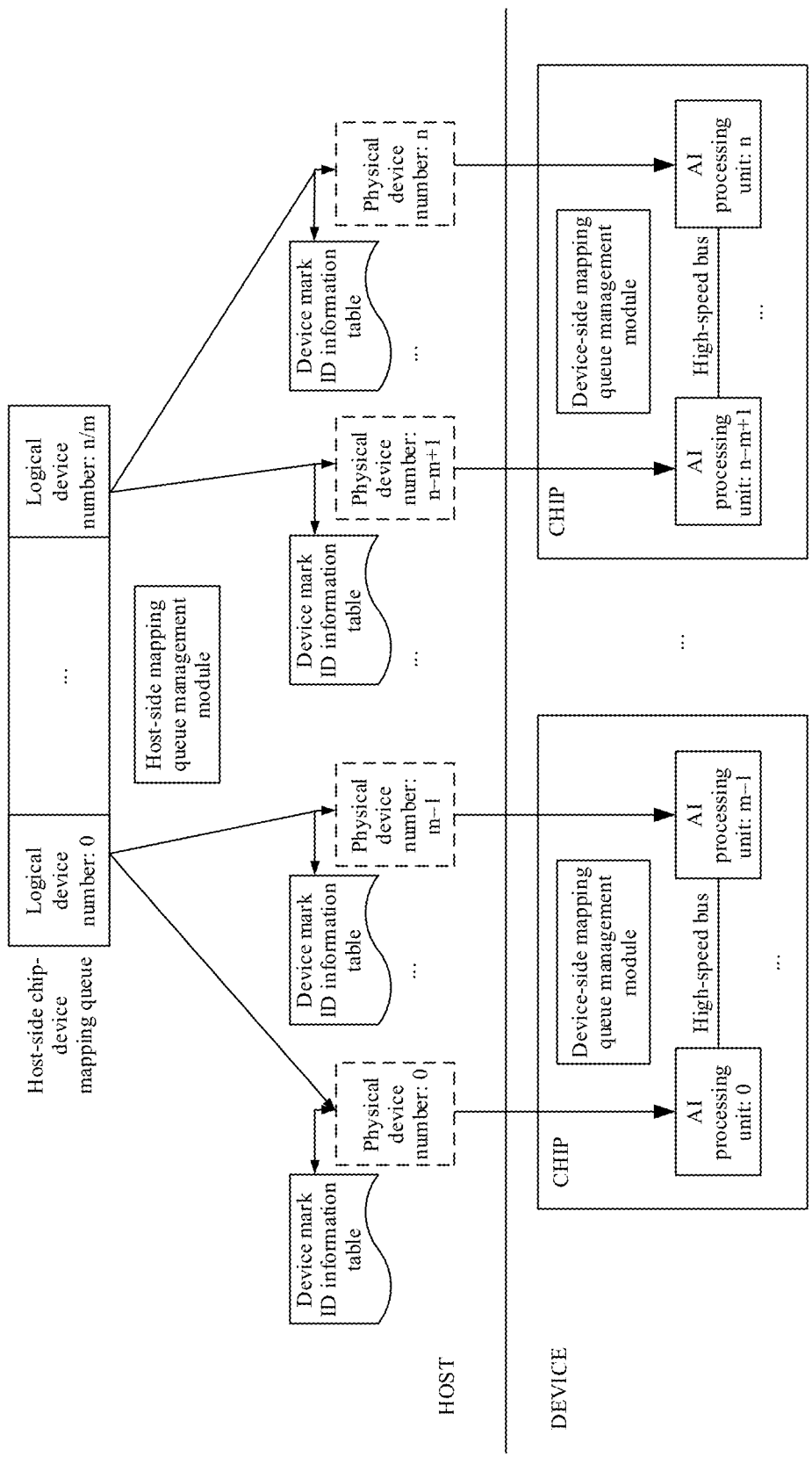
FIG. 9 is a diagram of a multi-chip management apparatus according to an embodiment.

To describe the chip management apparatus in this embodiment in more detail, the following describes an example with reference to FIG. 9. FIG. 9 is a diagram of a multi-chip management apparatus according to an embodiment. An embodiment provides a chip management apparatus in which a plurality of chips or dies (that is, a plurality of computing nodes) are packaged into one logical chip (that is, performing cooperative grouping). It should be noted that the chip management apparatus mentioned in this embodiment includes a system management unit, a device management unit, and a plurality of computing nodes. The system management unit may be a host-side mapping queue management module in FIG. 9. The device management unit may include a plurality of device management subunits, and each device management subunit may be a device-side mapping queue management module in FIG. 9. The plurality of computing nodes may be located in different chips (one chip may include two or more computing nodes). Each computing node may be an AI processing unit in FIG. 9. Further, in FIG. 9, n≥m≥1. Details are as follows.

Figure 10:
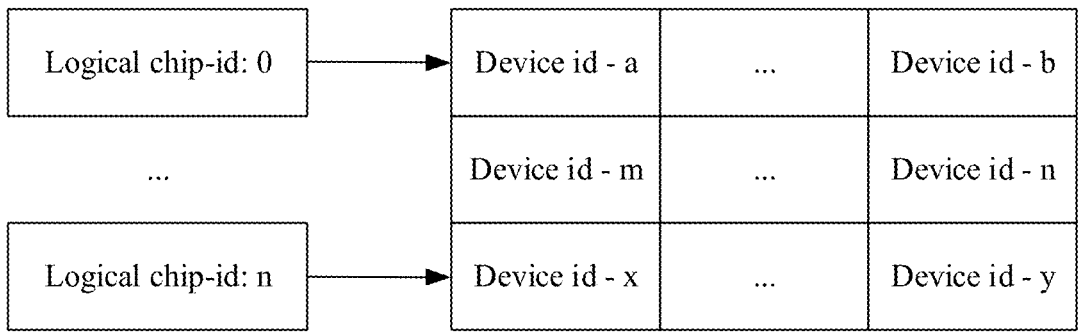
FIG. 10 is a diagram of a chip and device mapping table according to an embodiment.

First, a mapping relationship may be created between one logical chip and a plurality of devices (the device may be an AI processing unit with an independent AI processing capability, for example, a physical chip, a physical die, or a device obtained through computing power allocation, that is, a plurality of computing nodes) (that is, cooperative grouping is performed on the plurality of computing nodes). An establishment mechanism of the mapping relationship is as follows:

1. A chip-device mapping table may be a two-dimensional array. A primary index is a chip ID number, and a secondary index is a device ID number (that is, the physical device identifier mentioned above) to which the chip is mapped. The device ID number is a device symbol index corresponding to each PF or VF discovered by a PCIe driver through PCIe scanning. Generally, the device symbol index corresponds to one device. When establishing chip-device mapping (that is, the plurality of computing nodes are grouped, and each collaboration group can be marked by one logical device number), a system classifies devices that have a same function and equal capabilities in one physical chip and that are physically connected to each other to one logical chip. For example, FIG. 10 is a diagram of a chip and device mapping table according to an embodiment. In the figure, AI processing units whose device IDs are a to b correspond to a logical chip 0 (corresponding to one of the foregoing first collaboration groups). AI processing units whose device IDs are x to y correspond to a logical chip n (corresponding to another of the foregoing first collaboration groups).

2. Each device (that is, the computing node mentioned above) has a globally unique device mark ID (that is, the mark identifier mentioned above) generated based on a random algorithm, and the device mark ID may be stored in a shared memory provided externally by the device. The host-side mapping queue management module can access a shared memory space through a BAR space.

Figure 11:
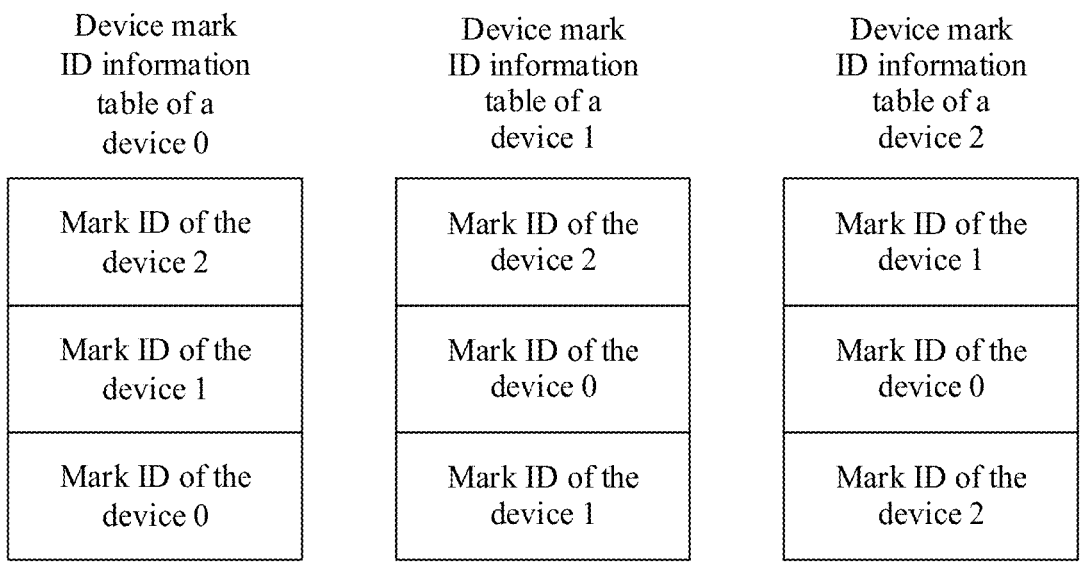
FIG. 11 is a diagram of a device mark identifier (ID) information table according to an embodiment.

3. The host-side mapping queue management module reads a device mark ID of each device from a BAR space of each device, and then writes the device mark ID to BAR spaces of other devices. Finally, each device stores its own device mark ID and the mark IDs of the other devices in a shared memory corresponding to the BAR space. These device mark IDs are stored together to form a device mark ID information table (that is, correspondingly, the foregoing system management unit obtains the first mapping relationship of each computing node, generates the first identification information table, and sends the first identification information table to each computing node). For example, FIG. 11 is a diagram of a device mark ID information table according to an embodiment. In the figure, three devices may be included: a device 0, a device 1, and a device 2. A device mark ID information table of each device stores device mark ID information of the other devices.

4. When each device is presented in a host system, there is a device number ID, and the device number ID (that is, the physical device identifier mentioned above) and the device mark ID (that is, the mark identifier mentioned above) are in a one-to-one correspondence.

5. The device-side mapping queue management module on the AI processor reads the device mark ID information in the BAR space or the shared memory, determines, based on internal logic, which devices belong to a chip or which devices are on a same hardware platform, and have a same capability and are physically interconnected through a high-speed bus, and then mark their relationships in the BAR space (that is, correspondingly, the device management unit associates, based on the first identification information table, mark identifiers of computing nodes that have an interconnection relationship).

6. The host-side mapping queue management module accesses the BAR space or the shared memory of the device based on the device number ID, then obtains a relationship of all device identifier IDs recorded by the device, and then establishes a chip-device mapping relationship table (that is, correspondingly, the system management unit groups the N computing nodes into the M first collaboration groups based on the interconnection relationship of the N computing nodes, and each collaboration group may have one logical device number).

Figure 12:
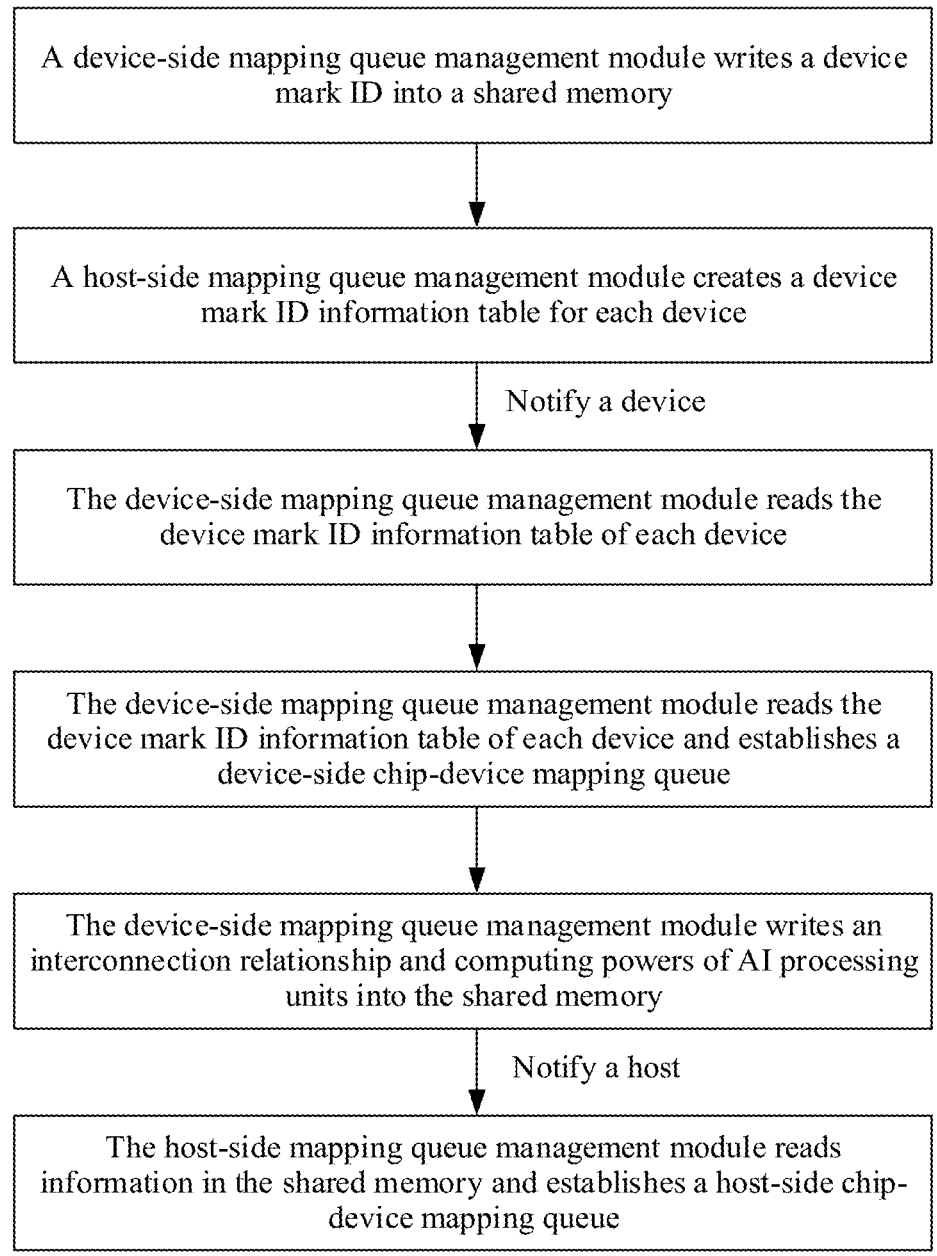
FIG. 12 is a diagram of a procedure for refreshing a chip-device mapping relationship table according to an embodiment.

7. A host-side software system performs a procedure for refreshing the chip-device mapping relationship table each time in scenarios such as a system initialization phase, or when a mapping relationship management interface is invoked, or when a device is hot swapped, or when a device is faulty. FIG. 12 is a diagram of a procedure for refreshing a chip-device mapping relationship table according to an embodiment. In the figure, the procedure for refreshing the chip-device mapping relationship table (that is, regrouping the N computing nodes) is specifically as follows: The device-side mapping queue management module writes a device mark ID into a shared memory; the host-side mapping queue management module creates a device mark ID information table for each device; the device-side mapping queue management module reads the device mark ID information table of each device; the device-side mapping queue management module reads the device mark ID information table of each device and establishes a device-side chip-device mapping queue; the device-side mapping queue management module writes an interconnection relationship and computing powers of AI processing units into the shared memory; and the host-side mapping queue management module reads information in the shared memory and establishes a host-side chip-device mapping queue.

8. In the foregoing procedure, the host-side mapping queue management module and the device-side mapping queue management module notify each other through interrupting, communication queue sharing, or the like.

9. This is also applicable to a virtual machine scenario. For a plurality of devices used in a same virtual machine VM through a PCIe pass-through mechanism, the foregoing method can be used to package the plurality of devices into one logical AI processing unit.

10. In a computing power allocation scenario, when one physical AI processing unit is divided into a plurality of logical or physical AI processing subunits (the logical or physical AI processing subunits are specifically determined by using a computing power allocation technology) by using the computing power allocation technology and these AI processing subunits are directly connected to virtual machines by using a single root input/output virtualization (SR-IOV) technology, a plurality of AI processing subunits that have a same capability and are interconnected through a high-speed bus in one virtual machine can be packaged into one logical AI processing unit with a higher capability through the foregoing procedure. In this case, the AI processing subunits may be AI processing units from a same physical entity, or may be AI processing units from different physical entities.

11. The device-side mapping queue management module may be implemented by a hardware circuit.

12. Currently, when host-side AI application software delivers a task to a device-side AI processing unit for executing, the device-side mapping queue management module verifies an execution task from one logical AI processing unit based on the device-side chip-device mapping queue, to ensure that the task is executed only on a physical AI processing unit corresponding to the logical AI processing unit.

According to the chip management apparatus provided in this embodiment, first, the mapping relationship between the physical AI processing unit and the logical AI processing unit, with the higher capability, formed by packaging the plurality of AI processing units is established, so that an AI training model that requires more AI resources can also be executed. Then, in the virtualization scenario, the plurality of AI processing units or logical AI processing subunits in the virtual machine can be packaged into the logical AI processing unit with the higher capability for AI computing. Compared with the technology, the host-side mapping queue management module and the device-side mapping queue management module in the chip establish a secure and reliable chip-device mapping mechanism based on the device mark ID information table. In this way, processing performance of the chip in the chip management apparatus is improved, and a case in which another device is maliciously used in a multi-user virtual machine scenario is avoided.

Figure 13:
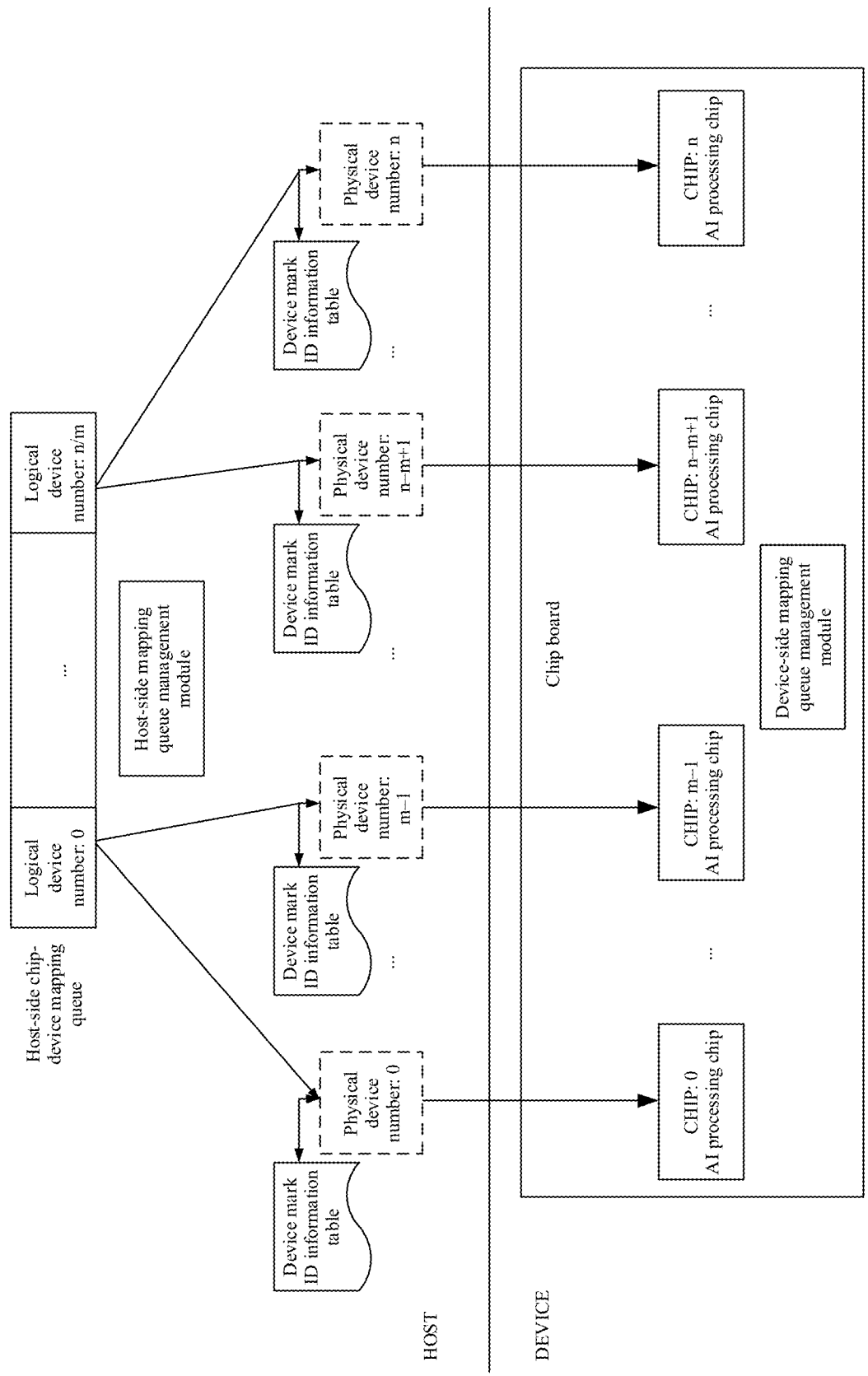
FIG. 13 is a diagram of another multi-chip management apparatus according to an embodiment.

To describe the chip management apparatus in this embodiment in more detail, the following describes an example with reference to FIG. 13. FIG. 13 is a diagram of another multi-chip management apparatus according to an embodiment. It should be noted that the chip management apparatus mentioned in this embodiment includes a system management unit, a device management unit, and a plurality of computing nodes. The system management unit may be a host-side mapping queue management module in FIG. 13. The device management unit may be a device-side mapping queue management module in FIG. 13. Each computing node in the plurality of computing nodes is located in one chip (which may also be understood as that one chip is one computing node). Each computing node may be an AI processing chip in FIG. 13. First, one board has a plurality of AI processing chips. These AI processing chips form one symmetric multiprocessing (SMP) system and run an OS operating system. Then, a device-side mapping queue feedback module is deployed on the operating system. Then, a step of separately establishing a chip-device mapping queue in a host and a device is consistent with that in the foregoing implementation solution (the implementation solution shown in FIG. 9). Details are not described herein again.

According to the chip management apparatus provided in this embodiment, processing performance of the chip in the chip management apparatus can be improved.

Figure 14:
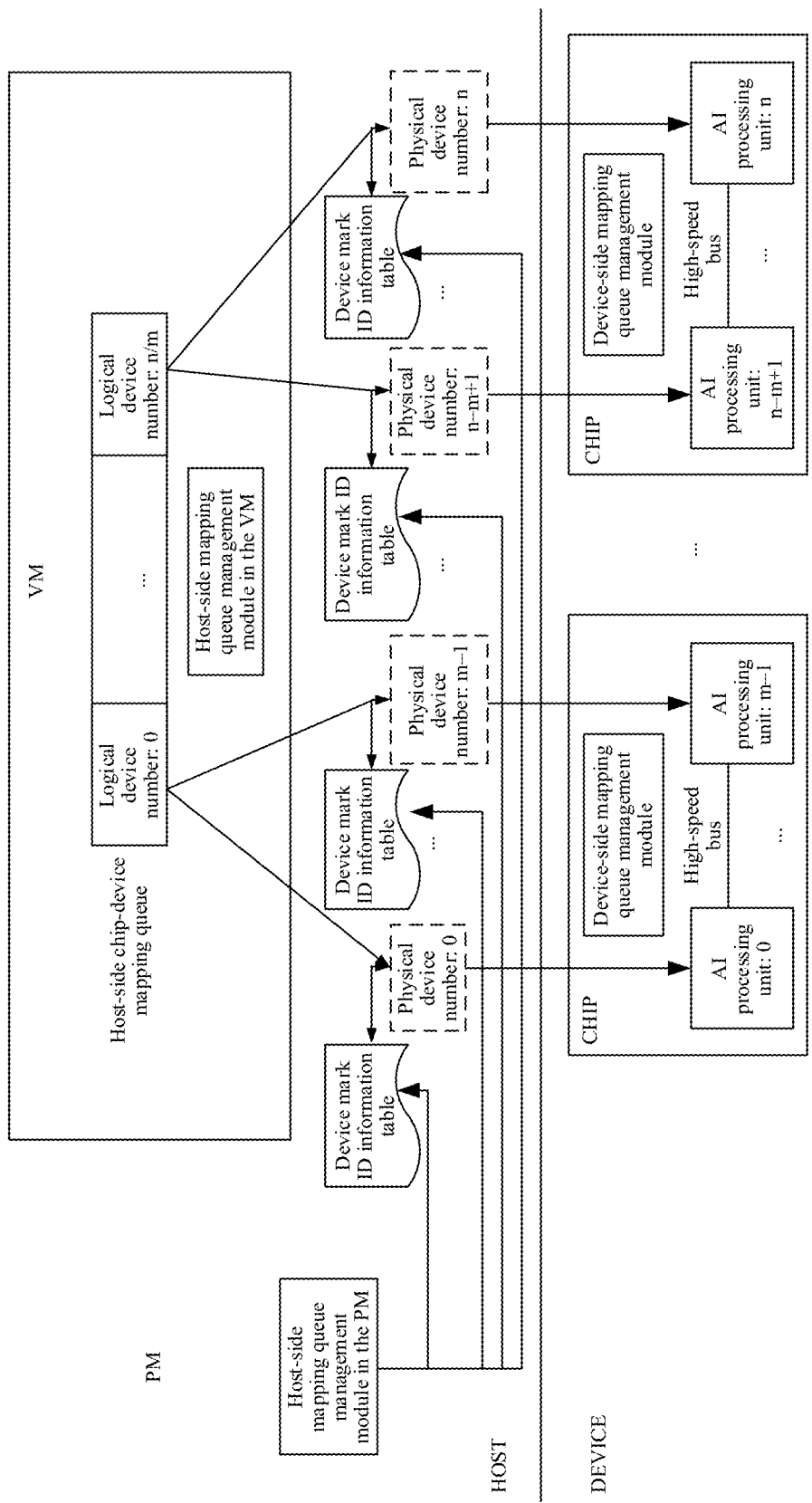
FIG. 14 is a diagram of still another multi-chip management apparatus according to an embodiment.

To describe the chip management apparatus in this embodiment in more detail, the following describes an example with reference to FIG. 14. FIG. 14 is a diagram of still another multi-chip management apparatus according to an embodiment. It should be noted that, compared with the chip management apparatus in FIG. 9, in the chip management apparatus mentioned in this embodiment, in a virtual machine (VM) scenario, a host-side mapping queue management module in a physical machine (PM) is added outside the VM. It should be further noted that, in the chip management apparatus in FIG. 14, the host-side mapping queue management module in the PM and a host-side mapping queue management module in the VM may form the system management unit mentioned in this embodiment. Details are as follows:

1. First, the host-side mapping queue management module in the PM writes device mark IDs of all physical devices that need to be added to a same VM into a shared memory of each physical device. The written information includes a device mark ID, device interconnection relationship information, and capability information. The information forms a device mark ID information table.

2. Then, after the VM system is initialized and started, the host-side mapping queue management module in the VM obtains a device mark ID information table of each device through a communication channel or a shared space between the host-side mapping queue management module and each device.

3. Then, the host-side mapping queue management module establishes host-side independent chip-device mapping based on the device mark ID information table of each device.

Compared with the technology, the host-side mapping queue management module in the PM, the host-side mapping queue management module in the VM, and the device-side mapping queue management module in the chip establish a secure and reliable chip-device mapping mechanism based on the device mark ID information table. In this way, processing performance of the chip in the chip management apparatus is improved, and a case in which another device is maliciously used in a multi-user virtual machine scenario is avoided.

The foregoing describes in detail the chip management apparatus in embodiments, and the following provides a related method in embodiments.

Figure 15:
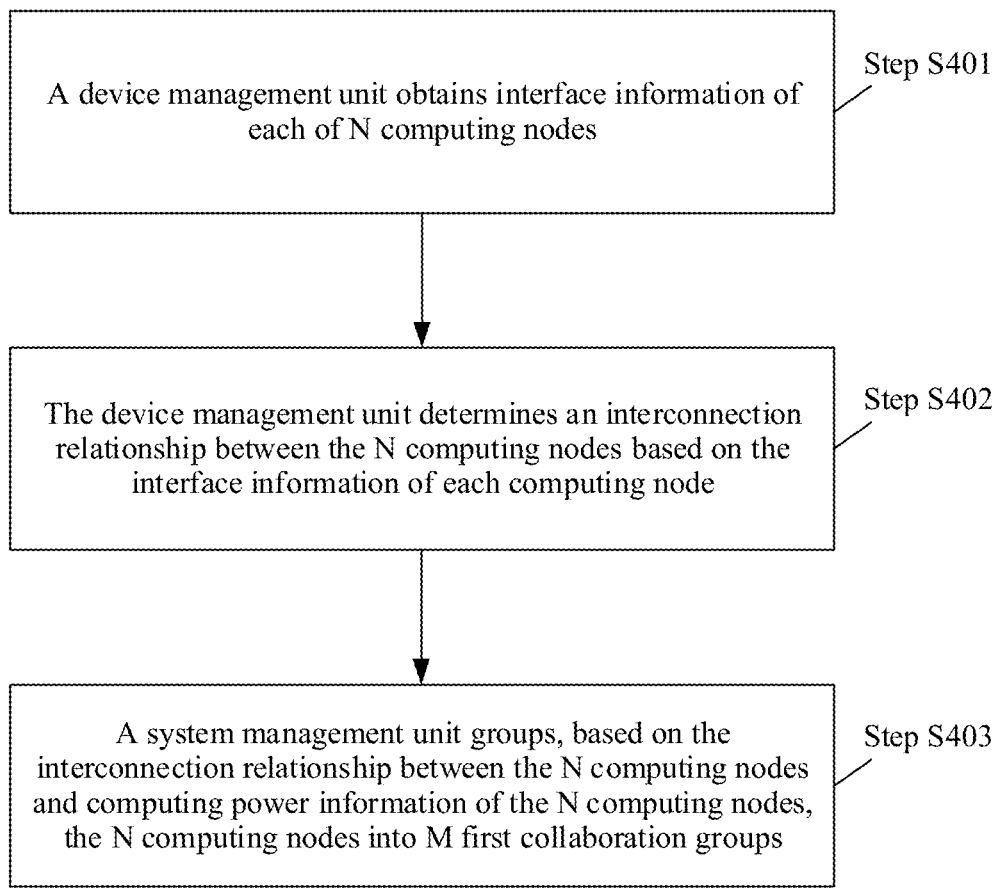
FIG. 15 is a flowchart of a chip management method according to an embodiment.

FIG. 15 is a flowchart of a chip management method according to an embodiment. The method is applicable to the foregoing chip management apparatus in FIG. 2 and a device including the chip management apparatus. The method may include step S401 to step S403. The chip management apparatus includes a device management unit, a system management unit, and N computing nodes. N is an integer greater than 0. Details are as follows:

Step 401: The device management unit obtains interface information of each of the N computing nodes.

Step 402: The device management unit determines an interconnection relationship between the N computing nodes based on the interface information of each computing node.

Step 403: The system management unit groups, based on the interconnection relationship between the N computing nodes and computing power information of the N computing nodes, the N computing nodes into M first collaboration groups.

Specifically, M is an integer greater than 0. Each of the M first collaboration groups includes at least one computing node, and the at least one computing node included in each first collaboration group has a same computing power and is physically interconnected.

In a possible implementation, the N computing nodes are located in L chips. The device management unit includes L device management subunits, one chip includes one device management subunit, and L is an integer greater than 0 and less than N. That the device management unit obtains interface information of each of the N computing nodes includes: A first device management subunit in the L device management subunits obtains interface information of K computing nodes included in a chip in which the first device management subunit is located, where the first device management subunit is any one of the L device management subunits. That the device management unit determines an interconnection relationship between the N computing nodes based on the interface information of each computing node includes: The first device management subunit determines interconnection relationship between the K computing nodes based on the interface information of the K computing nodes, where the interconnection relationship between the N computing nodes comprises an interconnection relationship between computing nodes in each of the L chips.

In a possible implementation, the N computing nodes are located in N chips, the N chips are cascaded on a chip board, the chip board includes the device management unit, and the interconnection relationship between the N computing nodes comprises an interconnection relationship between the N chips.

In a possible implementation, a plurality of applications are run on the N computing nodes, and the method further includes: The system management unit pre-groups the N computing nodes, where each pre-group includes a plurality of computing nodes that are capable of running a same application; and sends pre-grouping information of the N computing nodes to the device between the N computing nodes based on the pre-grouping information of the N computing nodes and the interface information of the N computing nodes.

In a possible implementation, the method further includes: The device management unit obtains a first identification information table from a target computing node, where the target computing node is any one of the N computing nodes; and associates, based on the first identification information table, a plurality of interconnected computing nodes in the N computing nodes.

In a possible implementation, each of the N computing nodes has one physical device identifier. The method further includes: Each of the N computing nodes generates one mark identifier, where each of the N computing nodes corresponds to a different mark identifier; and establishes a first mapping relationship between the mark identifier and the physical device identifier.

In a possible implementation, the method further includes: The system management unit obtains the first mapping relationship of each of the N computing nodes; and generates the first identification information table, where the first identification information table includes the first mapping relationship of each of the N computing nodes.

In a possible implementation, the method further includes: The system management unit sends the first identification information table to each of the N computing nodes. Each of the N computing nodes stores the first identification information table.

In a possible implementation, the method further includes: The system management unit groups interconnected computing nodes that have a same computing power and a same function into one first collaboration group.

In a possible implementation, the method further includes: The system management unit selects a target collaboration group from the M first collaboration groups based on a computing power requirement required by a to-be-executed task, where the to-be-executed task includes a plurality of parallel tasks; and respectively allocates the plurality of parallel tasks to a plurality of computing nodes based on mark identifiers of the plurality of computing nodes in the target collaboration group.

In a possible implementation, the method further includes: The device management unit determines, based on the first identification information table, physical device identifiers respectively corresponding to the mark identifiers of the plurality of computing nodes in the target collaboration group; and respectively allocates, based on the physical device identifiers respectively corresponding to the plurality of computing nodes, the plurality of parallel tasks to the corresponding computing nodes, where one parallel task corresponds to one physical device identifier.

In a possible implementation, the method further includes: Each computing node in the target collaboration group receives the parallel task allocated by the system management unit; determines whether the physical device identifier corresponding to the parallel task is consistent with a physical device identifier of the computing node in the target collaboration group; and if the physical device identifier corresponding to the parallel task is consistent with the physical device identifier of the computing node in the target collaboration group, executes the parallel task; or if the physical device identifier corresponding to the parallel task is inconsistent with the physical device identifier of the computing node in the target collaboration group, rejects to execute the parallel task.

According to the method provided in this embodiment, processing performance of the chip management apparatus can be improved.

A terminal device has a function of implementing any one of the foregoing chip management methods. The function may be implemented by hardware, or may be implemented by hardware executing corresponding software. The hardware or the software includes one or more modules corresponding to the function.

A terminal device includes a processor, and the processor is configured to support the terminal device in performing a corresponding function in the chip management method provided above. The terminal device may further include a memory. The memory is configured to be coupled to the processor, and stores program instructions and data that are for the terminal device. The terminal device may further include a communication interface configured to implement communication between the terminal device and another device or a communication network.

An embodiment provides a computer program. The computer program includes instructions, and when the computer program is executed by a computer, the computer can perform a procedure in any one of the chip management methods mentioned above.

A chip management apparatus includes a processor configured to support an application server or a terminal device in implementing a function in any one of the foregoing chip management methods, for example, generating or processing information in the foregoing method. In a possible design, the chip management apparatus further includes a memory, and the memory is configured to store program instructions and data that are for a data sending device. The chip management apparatus may include a chip, or may include the chip and another discrete device.

A semiconductor chip includes the chip management apparatus in any one of the content mentioned above.

An electronic device includes the semiconductor chip mentioned above.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that this disclosure is not limited to the described order of the actions because some steps may be performed in other orders or simultaneously. It should be further appreciated by a person skilled in the art that embodiments described in this specification all belong to example embodiments, and the involved actions and modules are not necessarily required.

In the several embodiments provided, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objective of the solutions of embodiments.

In addition, functional units in embodiments may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions may be implemented in the form of a software product. The computer software product is stored in a storage medium and includes several instructions for instructing a computer device (which may be a personal computer, a server, a network device, or the like, may specifically be a processor in the computer device) to perform all or some of the steps of the methods described in embodiments. The foregoing storage medium may include: any medium that can store program code, such as a USB flash drive, a removable hard disk, a magnetic disk, an optical disc, a read-only memory (ROM), or a random-access memory (RAM).

The foregoing embodiments are merely intended for describing the technical solutions. Although this disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments.

What is claimed is:

1. An apparatus comprising:
   N computing nodes;
   a device manager configured to:
     obtain N interface informations of the N computing nodes; and
     determine first interconnection relationships among the N computing nodes based on the N interface informations; and
   a system manager configured to group, based on the first interconnection relationships and N computing power informations of the N computing nodes, the N computing nodes into M collaboration groups,
   wherein N is an integer greater than 1,
   wherein M is an integer greater than 0,
   wherein each of the M collaboration groups comprises at least one computing node of the N computing nodes, and
   wherein within each of the M collaboration groups all of the at least one computing node have a same computing power and are physically interconnected.

2. The apparatus of claim 1, further comprising L chips, wherein the L chips comprise the N computing nodes, wherein the device manager comprises L device sub-managers respectively in the L chips, wherein L is an integer greater than 0 and less than N, wherein the L device sub-managers comprise a first device sub-manager in a first chip of the L chips, wherein the first chip comprises K computing nodes of the N computing nodes, and wherein the first device sub-manager is configured to:
   obtain K interface informations that are of the K computing nodes and that are in the N interface informations; and
   determine a second interconnection relationship among the K computing nodes based on the K interface informations.

3. The apparatus of claim 1, further comprising:
   a chip board comprising the device manager; and
   N chips comprising the N computing nodes and cascaded on the chip board.

4. The apparatus of claim 1, wherein the system manager is further configured to:
   obtain pre-grouping information by pre-grouping the N computing nodes into pre-groups, wherein within each of the pre-groups all of a plurality of computing nodes of the N computing nodes are capable of running a same application; and
   send the pre-grouping information to the device manager, and
   wherein the device manager is further configured to determine the first interconnection relationships based on the pre-grouping information and the N interface informations.

5. The apparatus of claim 1, wherein the device manager is further configured to:
   obtain an identification information table from a target computing node of the N computing nodes; and
   associate, based on the identification information table, interconnected computing nodes of the N computing nodes.

6. The apparatus of claim 5, wherein the N computing nodes have N physical device identifiers and are configured to:
   generate mark identifiers; and
   establish mapping relationships between the mark identifiers and the N physical device identifiers.

7. The apparatus of claim 6, wherein the system manager is further configured to:
   obtain the mapping relationships; and
   generate the identification information table, wherein the identification information table comprises the mapping relationships.

8. The apparatus of claim 6, wherein the device manager is further configured to:
   obtain the identification information table from the target computing node based on a first physical device identifier that is of the target computing node and that is in the N physical device identifiers; and
   associate, based on the identification information table, the mark identifiers of the interconnected computing nodes.

9. The apparatus of claim 1, wherein the system manager is further configured to group interconnected computing nodes that are of the N computing nodes, have a same computing power, and have a same function into a first collaboration group of the M collaboration groups.

10. The apparatus of claim 6, wherein the system manager is further configured to:
    select a target collaboration group from the M collaboration groups based on a computing power requirement required by a to-be-executed task, wherein the to-be-executed task comprises parallel tasks, and wherein the target collaboration group comprises first computing nodes of the N computing nodes; and
    respectively allocate the parallel tasks to of the first computing nodes based on mark identifiers of the first computing nodes.

11. The apparatus of claim 10, wherein the device manager is further configured to:
    determine, based on the identification information table, first physical device identifiers that are of the N physical device identifiers and that correspond to the mark identifiers; and

respectively allocate, based on the first physical device identifiers, the parallel tasks to the first computing nodes.

12. A method comprising:
obtaining N interface informations of N computing nodes;
determining first interconnection relationships among the N computing nodes based on the N interface informations; and
grouping, based on the first interconnection relationships and N computing power informations of the N computing nodes, the N computing nodes into M collaboration groups,
wherein N is an integer greater than 1,
wherein M is an integer greater than 0,
wherein each of the M collaboration groups comprises at least one computing node of the N computing nodes, and
wherein within each of the M collaboration groups all of the at least one computing node have a computing power and are physically interconnected.

13. The method of claim 12, wherein the N computing nodes comprise K computing nodes in a chip, and wherein the method further comprises:
obtaining K interface informations that are of the K computing nodes and that are in the N interface informations; and
determining a second interconnection relationship among the K computing nodes based on the K interface informations.

14. The method of claim 12, further comprising:
obtaining pre-grouping information by pre-grouping the N computing nodes into pre-groups, wherein within each of the pre-groups a plurality of computing nodes of the N computing nodes are capable of running a same application;
sending the pre-grouping information to a device manager; and
determining the first interconnection relationships based on the pre-grouping information and the N interface informations.

15. The method of claim 12, further comprising:
obtaining an identification information table from a target computing node of the N computing nodes; and
associating, based on the identification information table, interconnected computing nodes of the N computing nodes.

16. The method of claim 15, further comprising:
generating mark identifiers; and
establishing mapping relationships between the mark identifiers and N physical device identifiers of the N computing nodes.

17. The method of claim 16, further comprising:
obtaining the mapping relationships; and
generating the identification information table, wherein the identification information table comprises the mapping relationships.

18. A computer program product comprising instructions that are stored on a non-transitory computer-readable medium and that, when executed by one or more processors, cause an apparatus to:
obtain N interface informations of N computing nodes;
determine an interconnection relationship among the N computing nodes based on the N interface informations; and
group, based on the interconnection relationship and computing power information of the N computing nodes, the N computing nodes into M collaboration groups,
wherein N is an integer greater than 1,
wherein M is an integer greater than 0,
wherein each of the M collaboration groups comprises at least one computing node of the N computing nodes, and
wherein within each of the M collaboration groups all of the at least one computing node have a same computing power and are physically interconnected.

19. The method of claim 16, further comprising:
obtaining the identification information table from the target computing node based on a first physical device identifier that is of the target computing node and that is in the N physical device identifiers; and
associating, based on the identification information table, the mark identifiers of the interconnected computing nodes.

20. The method of claim 16, further comprising:
selecting a target collaboration group from the M collaboration groups based on a computing power requirement required by a to-be-executed task, wherein the to-be-executed task comprises parallel tasks, and wherein the target collaboration group comprises first computing nodes of the N computing nodes; and
respectively allocating the parallel tasks to the first computing nodes based on mark identifiers of the first computing nodes.

* * * * *